(12) United States Patent
Hatanaka et al.

(10) Patent No.: US 10,838,226 B2
(45) Date of Patent: Nov. 17, 2020

(54) OPTICAL DEVICE AND DISPLAY UNIT

(71) Applicant: SONY CORPORATION, Tokyo (JP)

(72) Inventors: Takayuki Hatanaka, Kanagawa (JP); Minoru Nakano, Kanagawa (JP)

( * ) Notice: Subject to any disclaimer, the term of this patent is extended or adjusted under 35 U.S.C. 154(b) by 41 days.

(21) Appl. No.: 15/743,875

(22) PCT Filed: Jul. 12, 2016

(86) PCT No.: PCT/JP2016/070575
§ 371 (c)(1),
(2) Date: Jan. 11, 2018

(87) PCT Pub. No.: WO2017/018204
PCT Pub. Date: Feb. 2, 2017

(65) Prior Publication Data
US 2018/0203244 A1    Jul. 19, 2018

(30) Foreign Application Priority Data

Jul. 27, 2015  (JP) ................................ 2015-147379

(51) Int. Cl.
*G02B 30/56* (2020.01)
*G02B 5/136* (2006.01)
(Continued)

(52) U.S. Cl.
CPC ............ *G02B 30/56* (2020.01); *G02B 5/124* (2013.01); *G02B 5/136* (2013.01); *G02B 5/09* (2013.01)

(58) Field of Classification Search
CPC .. G02B 5/09; G02B 5/12–136; G02B 5/1861; G02B 5/1866; G02B 5/1871;
(Continued)

(56) References Cited

U.S. PATENT DOCUMENTS 6,021,559 A * 2/2000 Smith ................. B29C 33/3842
29/527.4
6,816,214 B1 * 11/2004 Ohsumi ............... G02B 6/0038
349/65
(Continued)

FOREIGN PATENT DOCUMENTS

CN   102385080 A   3/2012
CN   102460269 A   5/2012
(Continued)

OTHER PUBLICATIONS

International Search Report and Written Opinion of PCT Application No. PCT/JP2016/070575, dated Oct. 11, 2016, 09 pages of ISRWO.

(Continued)

*Primary Examiner* — Nicholas R. Pasko
(74) *Attorney, Agent, or Firm* — Chip Law Group

(57) ABSTRACT

This optical device includes an incidence plane and an output plane facing each other and a plurality of reflectors that are disposed between the incidence plane and the output plane and each reflect light incident from the incidence plane toward the output plane. Each of the plurality of reflectors has a first reflection surface and a second reflection surface disposed orthogonal to each other, and a line of intersection between the first reflection surface and the second reflection surface being inclined with respect to a normal to the incidence plane.

19 Claims, 25 Drawing Sheets

(51) Int. Cl.
*G02B 5/124* (2006.01)
*G02B 5/09* (2006.01)

(58) Field of Classification Search
CPC .............. G02B 5/1876; G02B 27/2271; G02B 27/2292; G02B 27/24; G02B 2207/123; G02B 17/002; G02B 17/006; G02B 6/0053; G02B 30/56
USPC .... 359/32, 33, 459, 479, 529, 850, 851, 855
See application file for complete search history.

(56) References Cited

U.S. PATENT DOCUMENTS

| | | | | |
|---|---|---|---|---|
| 8,434,872 | B2* | 5/2013 | Maekawa | G02B 30/56 353/10 |
| 8,591,035 | B2* | 11/2013 | Yoneno | G03B 21/28 353/10 |
| 8,867,136 | B2* | 10/2014 | Hashikawa | G02B 30/56 359/627 |
| 2011/0181949 | A1 | 7/2011 | Hashikawa | |
| 2012/0050876 | A1* | 3/2012 | Sugiyama | G02B 5/124 359/625 |
| 2012/0140325 | A1* | 6/2012 | Sugiyama | G02B 5/136 359/546 |
| 2012/0268640 | A1* | 10/2012 | Shimatani | G02B 30/35 348/333.1 |
| 2012/0320322 | A1* | 12/2012 | Imamura | G02B 30/56 349/113 |

FOREIGN PATENT DOCUMENTS

| | | |
|---|---|---|
| JP | 56-038306 A | 4/1981 |
| JP | 56-038306 U | 4/1981 |
| JP | 56-38306 U | 4/1981 |
| JP | 2009-276698 A | 11/2009 |
| JP | 2012-128454 A | 7/2012 |
| JP | 2013-088556 A | 5/2013 |
| JP | 2013-257529 A | 12/2013 |
| JP | 2014-016576 A | 1/2014 |
| WO | 2009/136578 A1 | 11/2009 |
| WO | 2014/024677 A1 | 2/2014 |

OTHER PUBLICATIONS

Office Action for CN Patent Application No. 2016800426872, dated Dec. 26, 2019, 11 pages of Office Action and 09 pages of English Translation.

Office Action for JP Patent Application No. 2017-531126, dated Apr. 28, 2020, 4 pages of Office Action and 4 pages of English Translation.

* cited by examiner

[ FIG. 1A ]
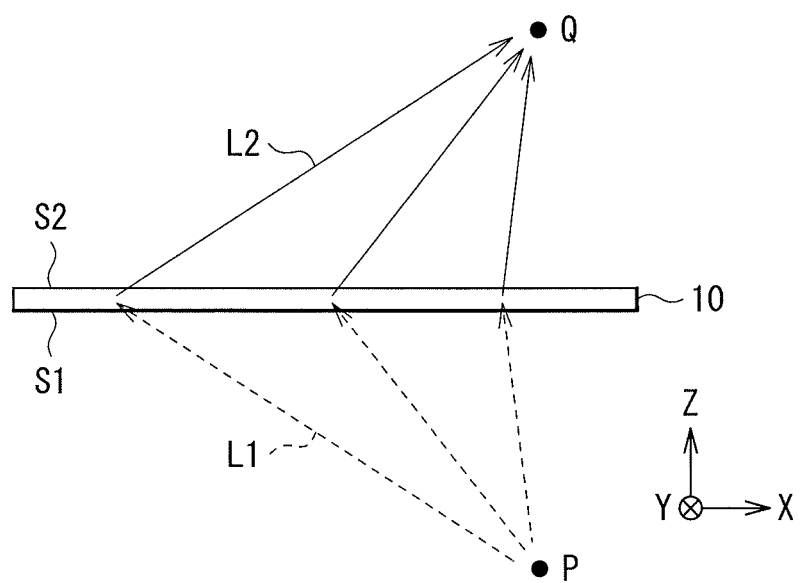
[ FIG. 1B ]
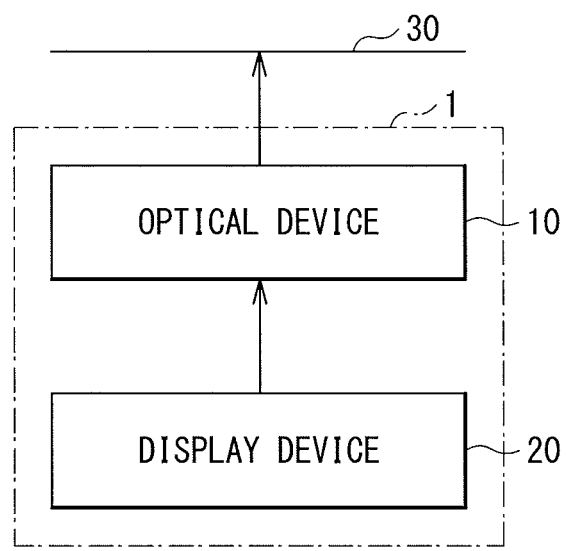

[ FIG. 2 ]
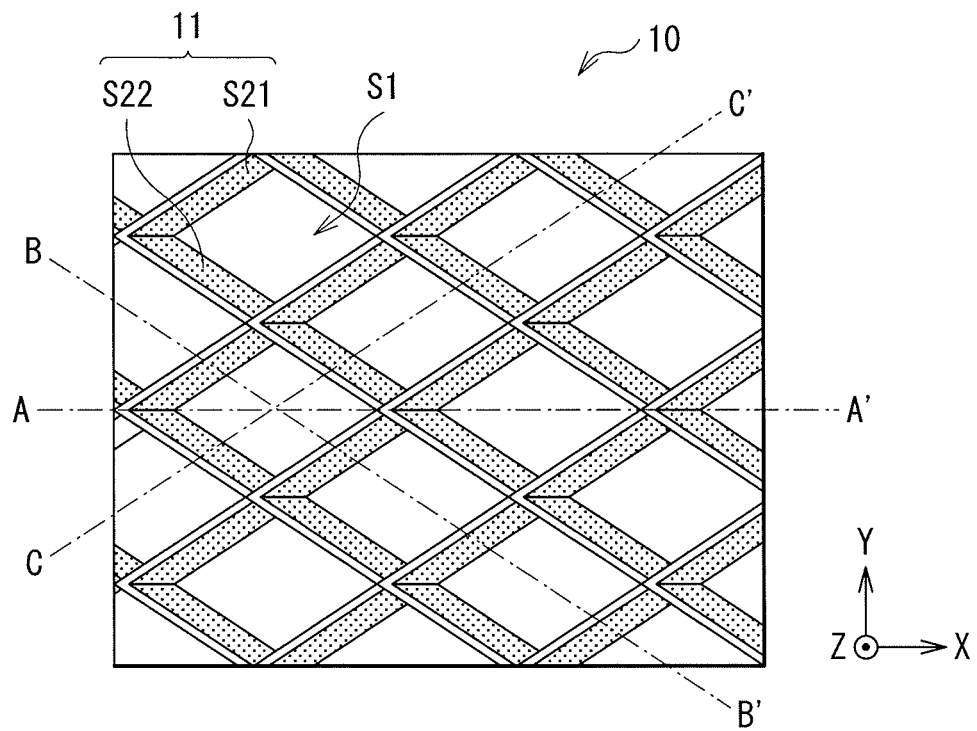
[ FIG. 3 ]
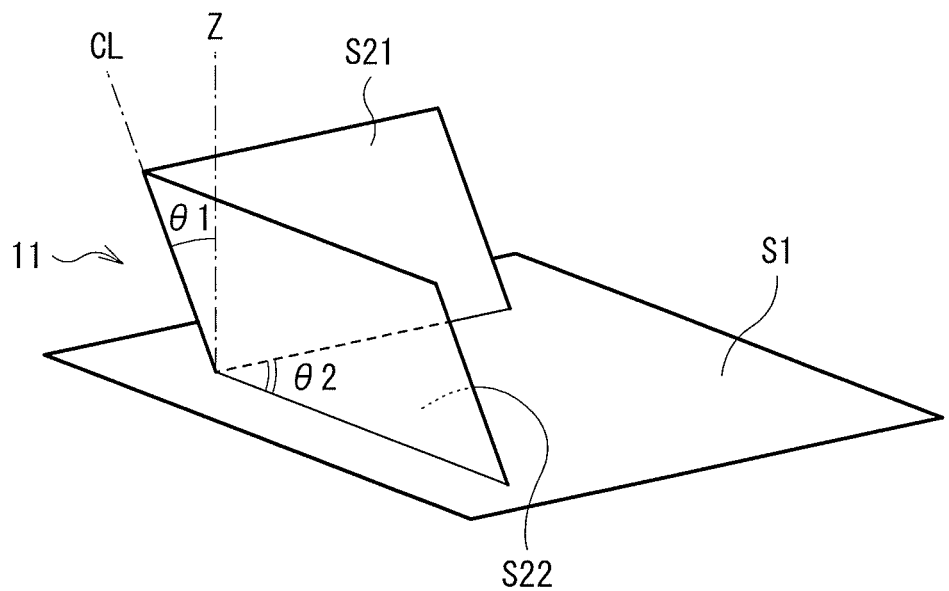

[ FIG. 4 ]
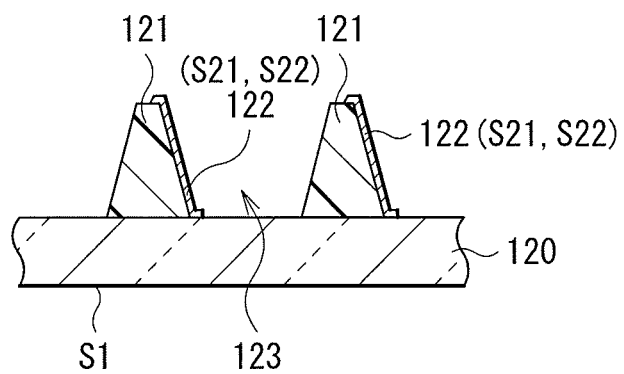
[ FIG. 5 ]
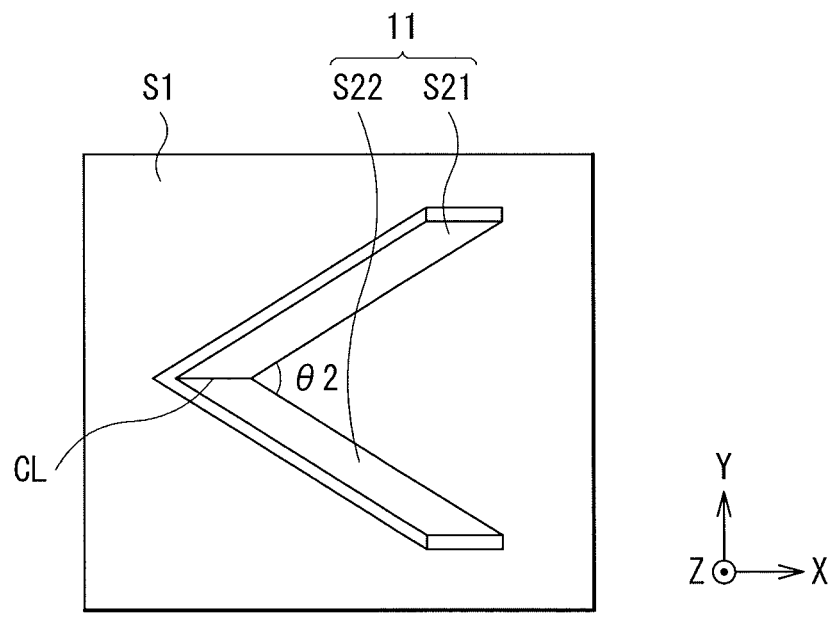

[ FIG. 6A ]
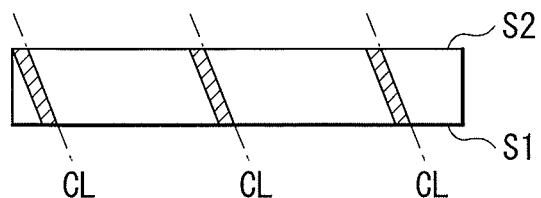
[ FIG. 6B ]
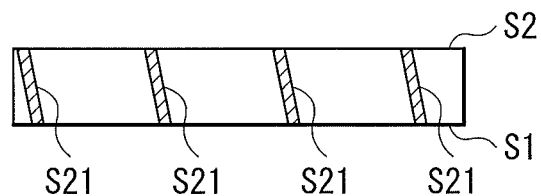
[ FIG. 6C ]
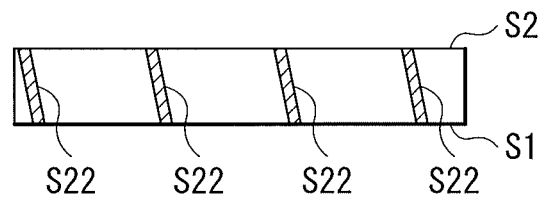

[ FIG. 7 ]
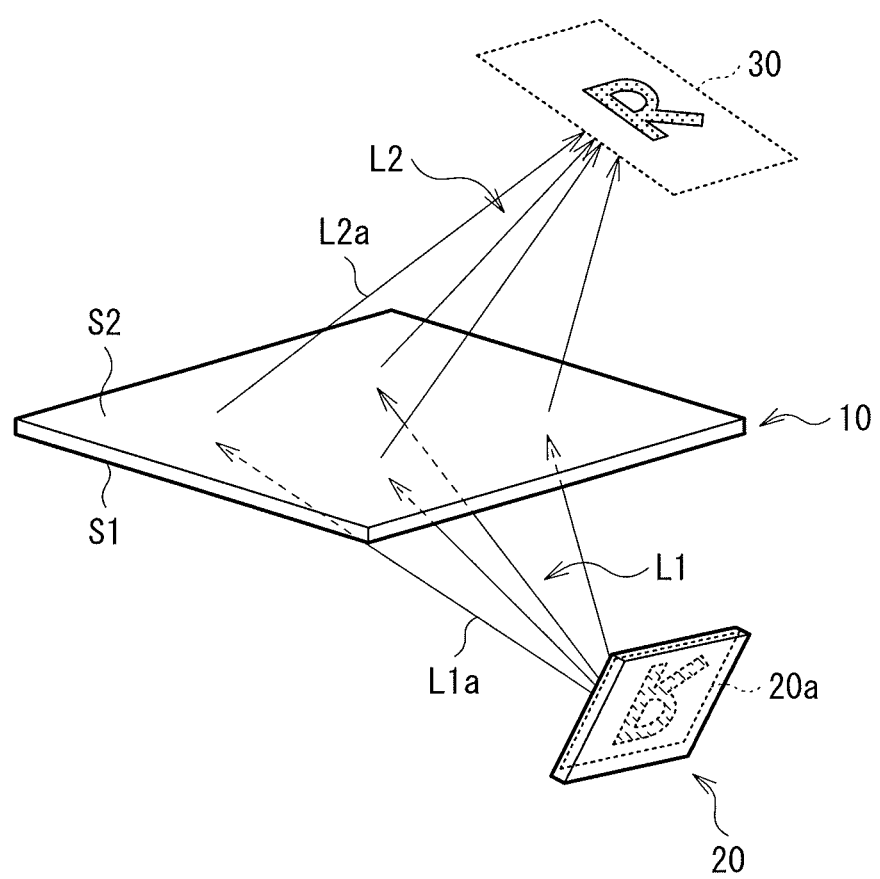

[ FIG. 8A ]
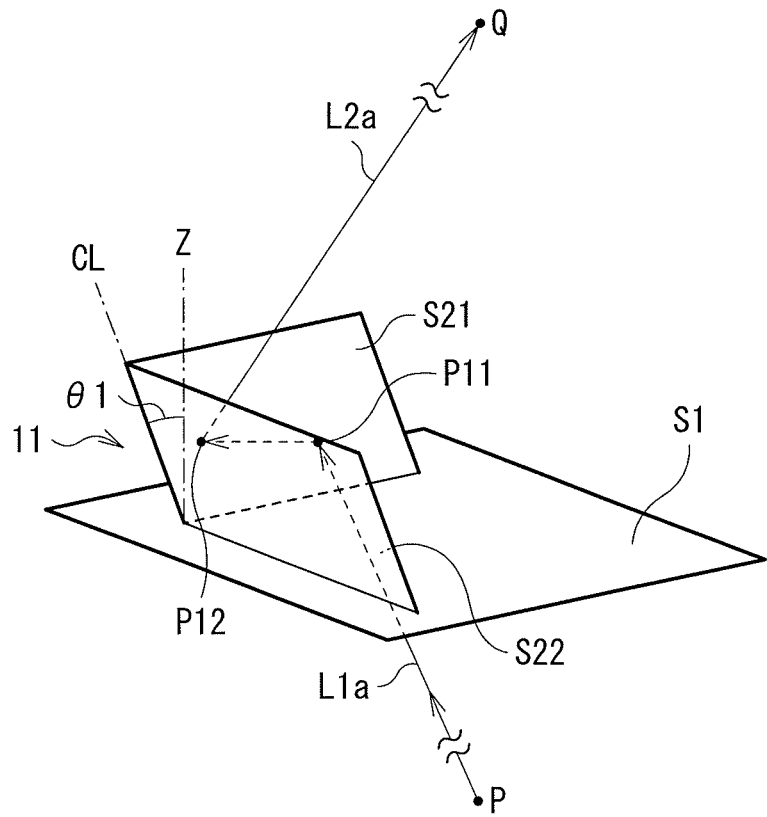
[ FIG. 8B ]
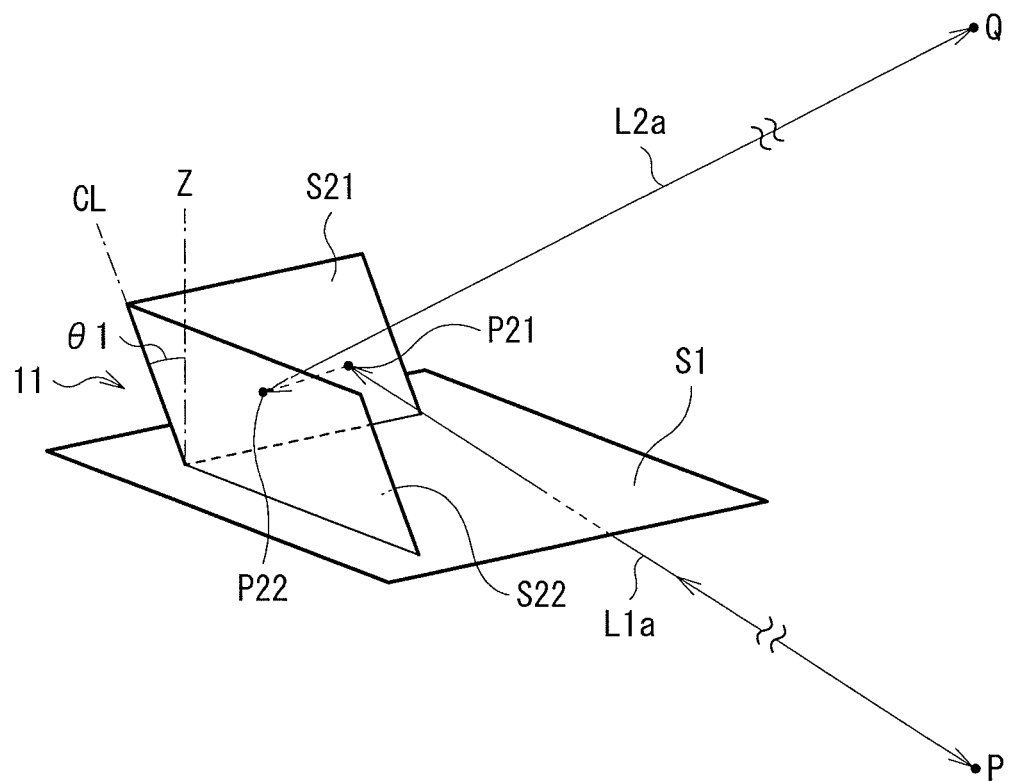

[ FIG. 9A ]
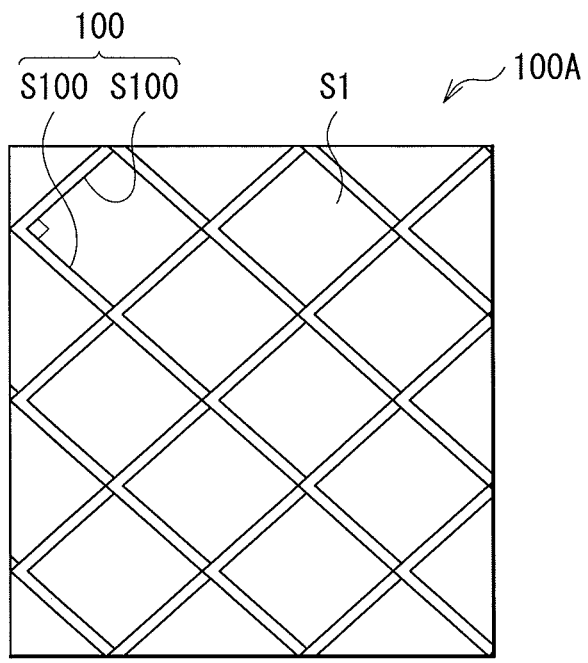
[ FIG. 9B ]
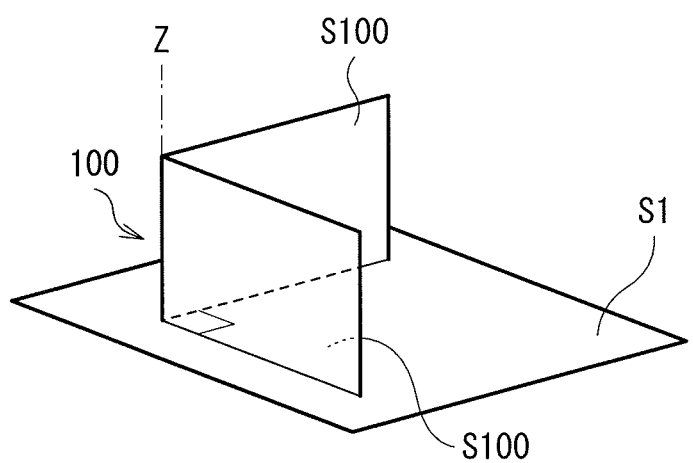

[ FIG. 10A ]
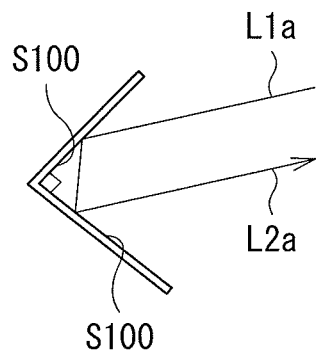
[ FIG. 10B ]
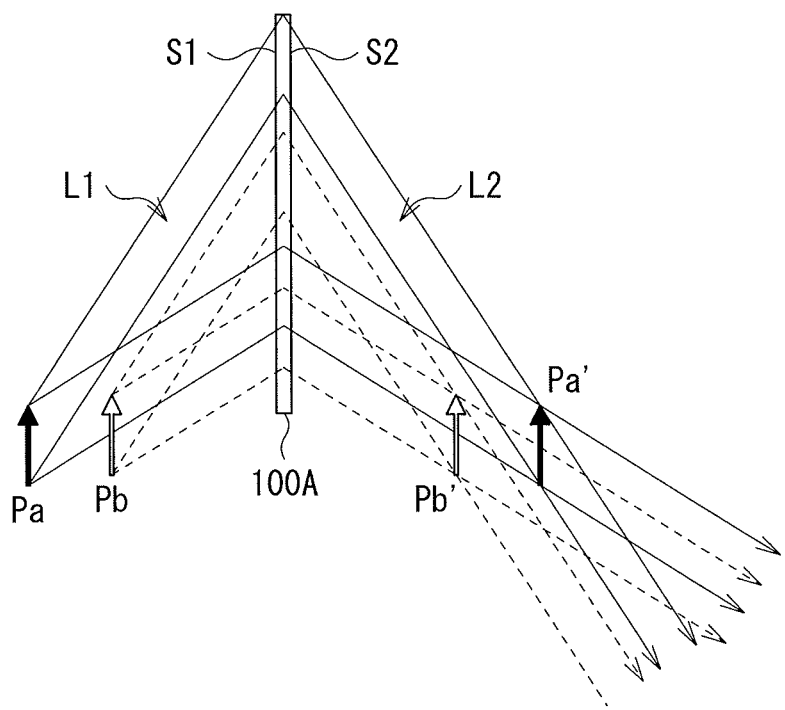

[ FIG. 11 ]
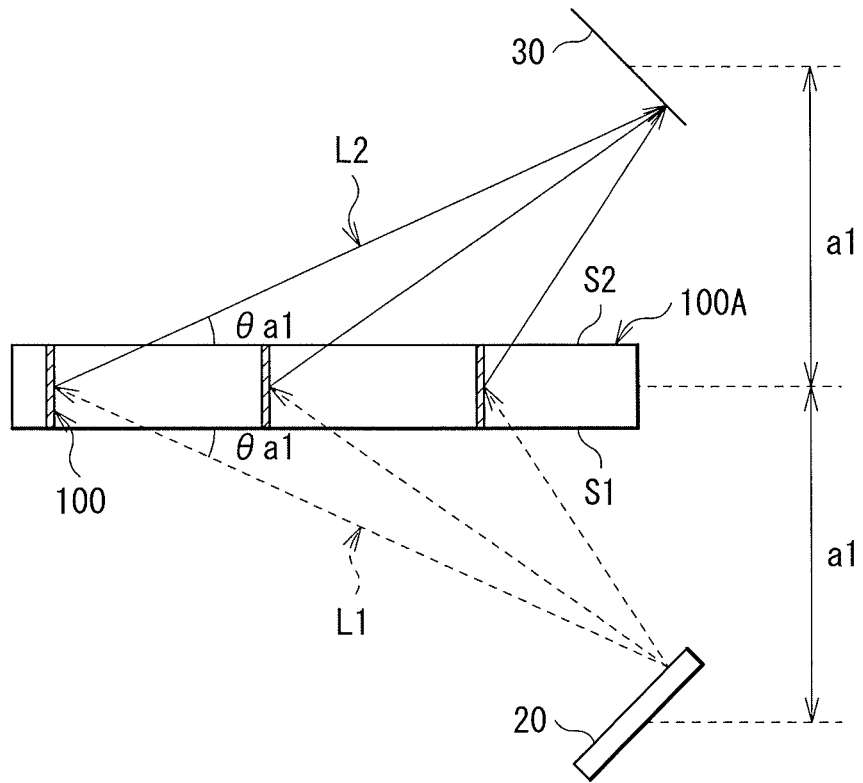
[ FIG. 12 ]
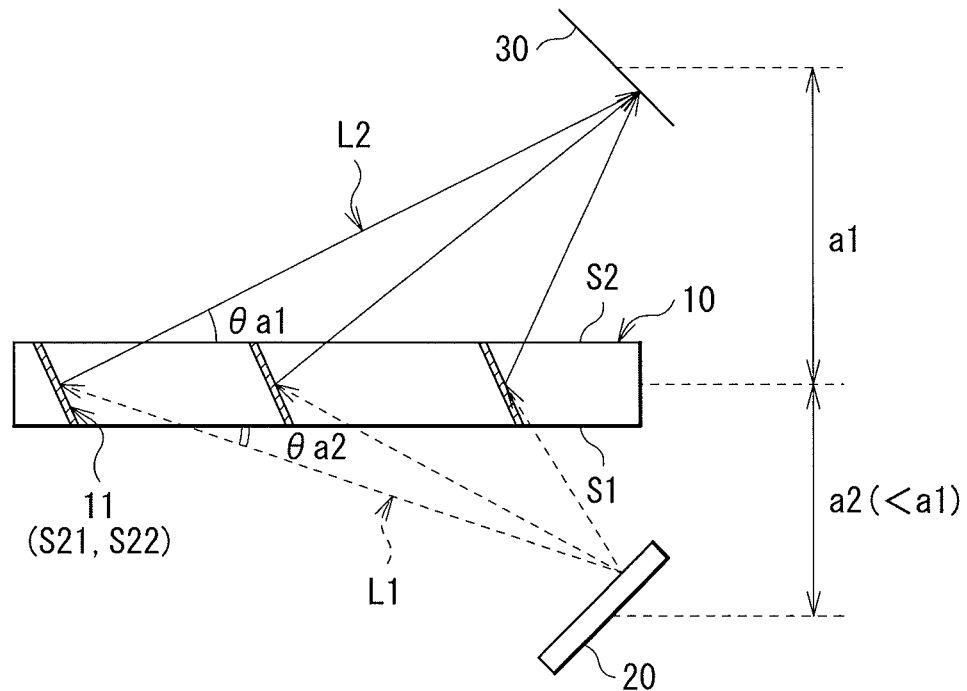

[ FIG. 13A ]
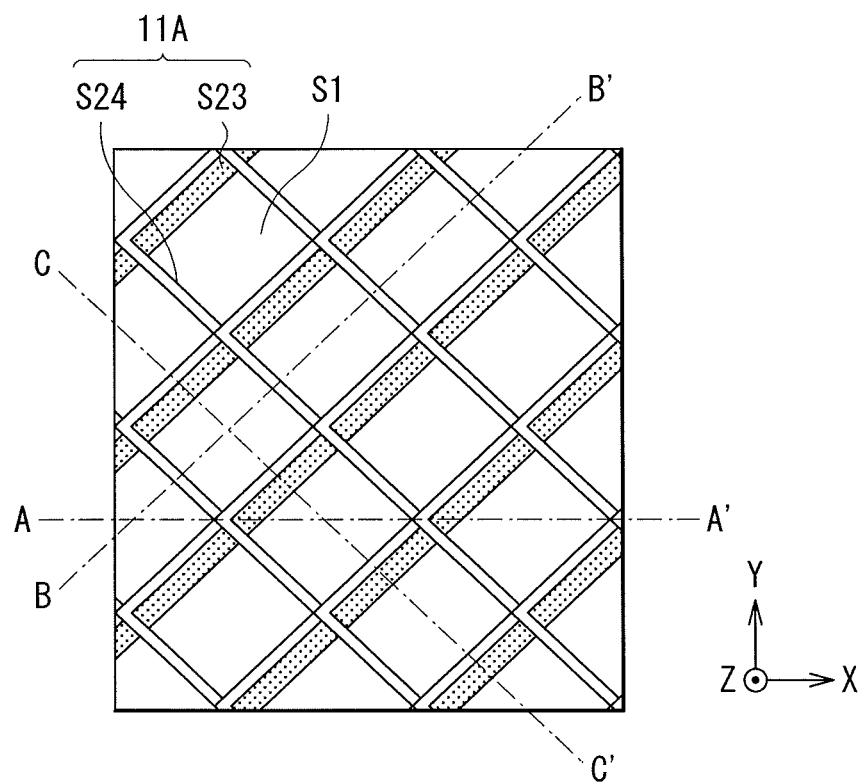
[ FIG. 13B ]
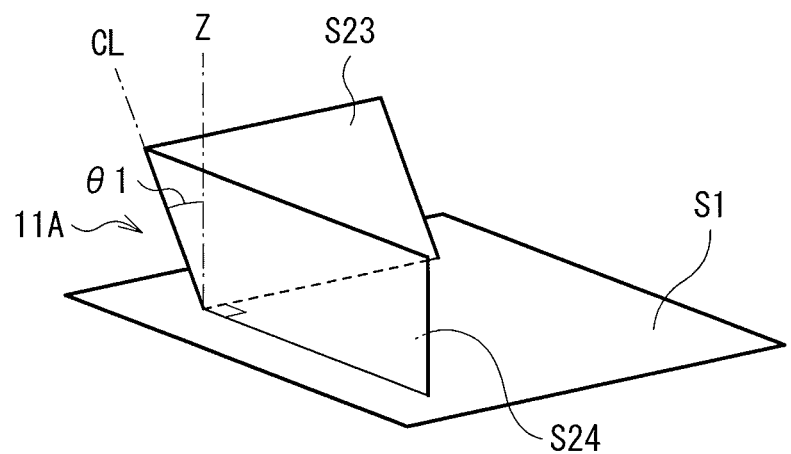

[ FIG. 14 ]
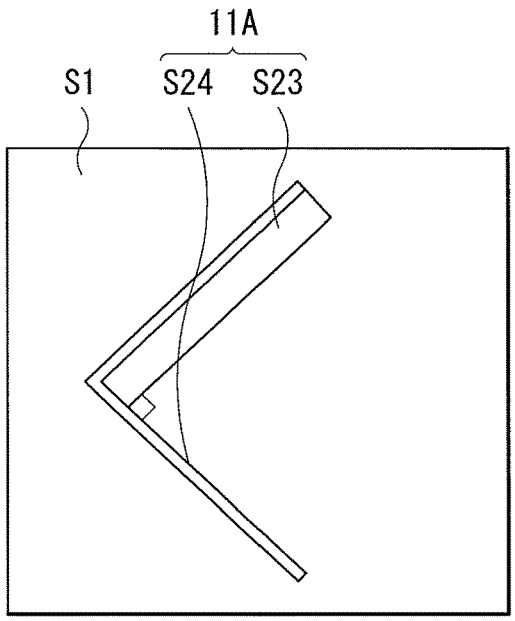
[ FIG. 15A ]
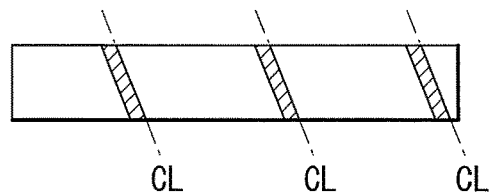
[ FIG. 15B ]
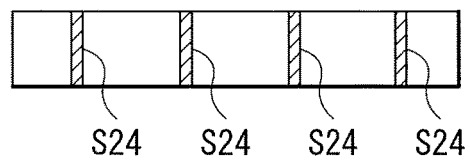
[ FIG. 15C ]
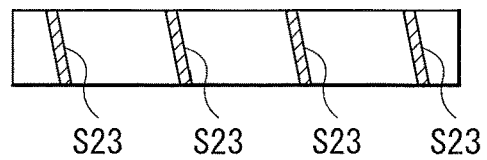

[ FIG. 16 ]
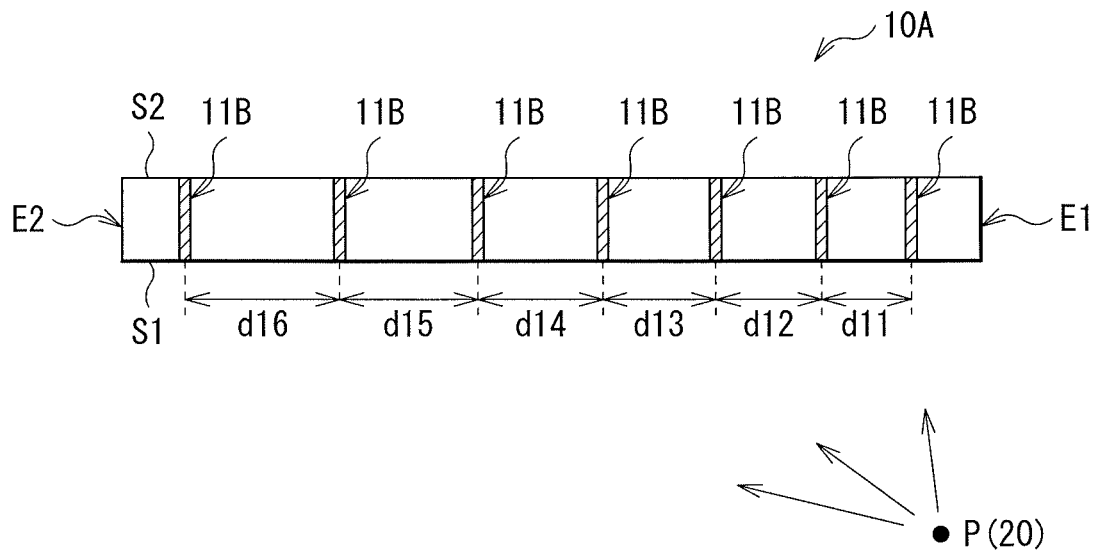
[ FIG. 17 ]
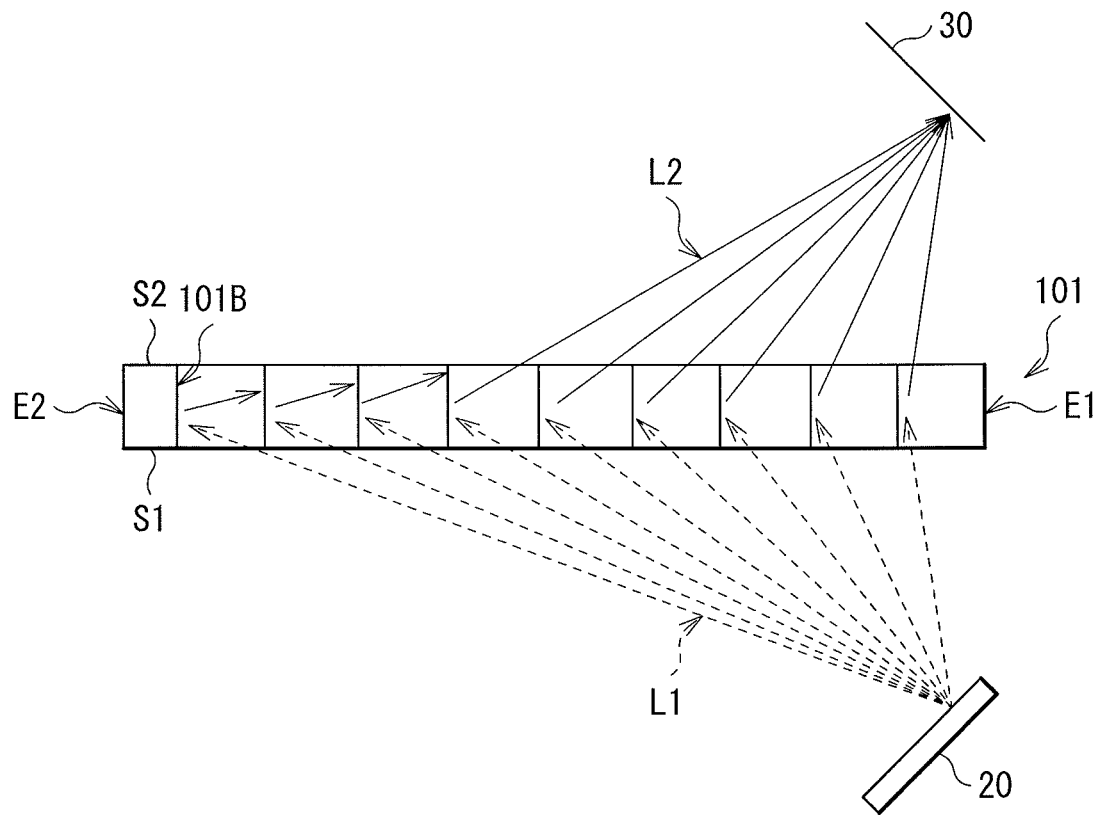

[ FIG. 18 ]
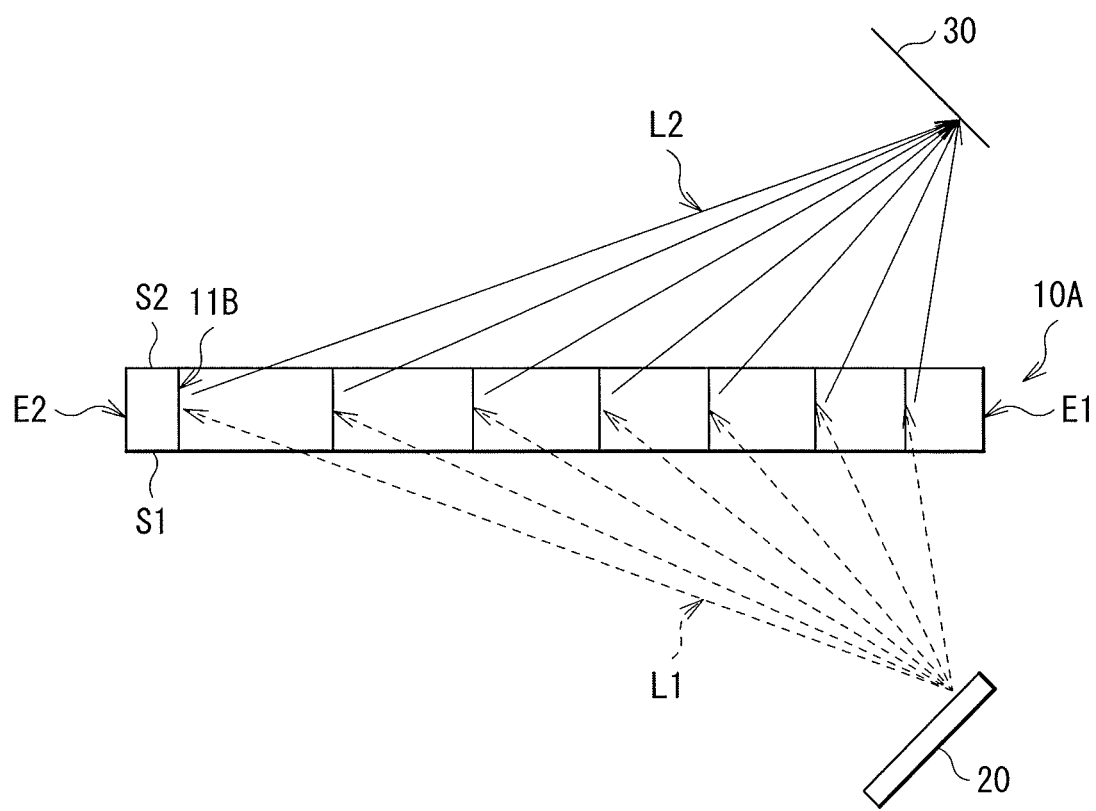

[ FIG. 19 ]
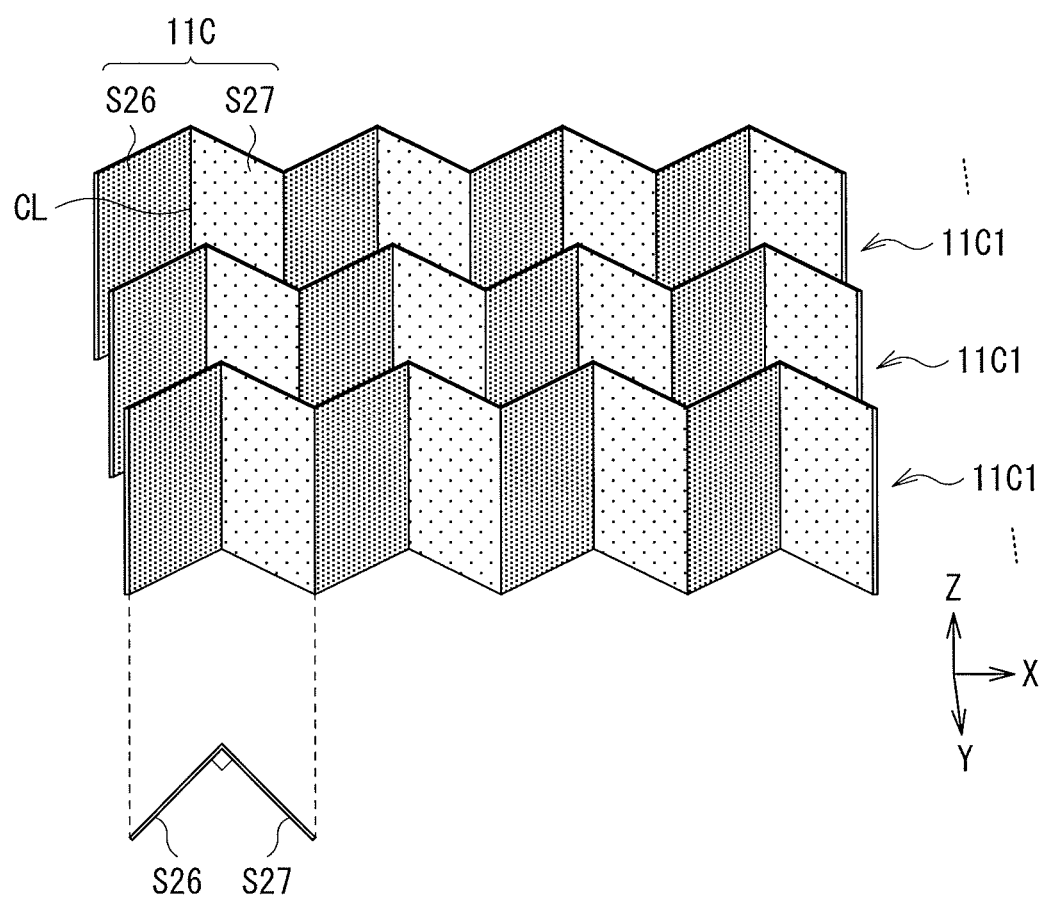

[ FIG. 20 ]
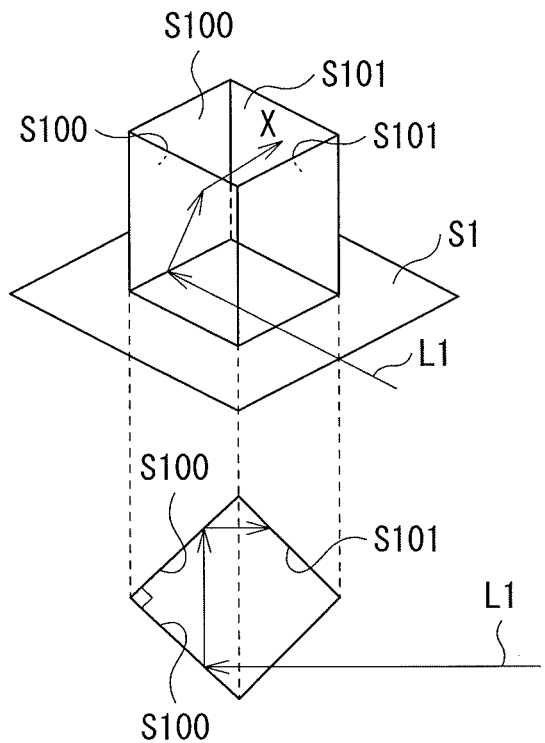
[ FIG. 21 ]
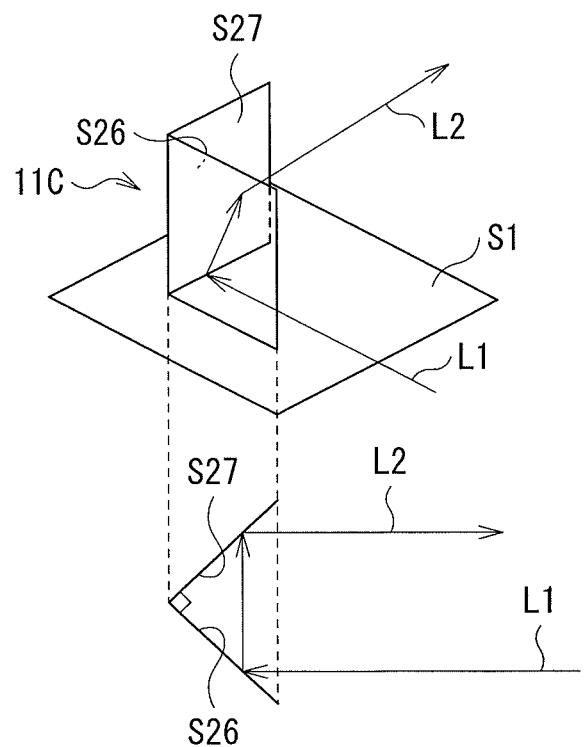

[ FIG. 22 ]
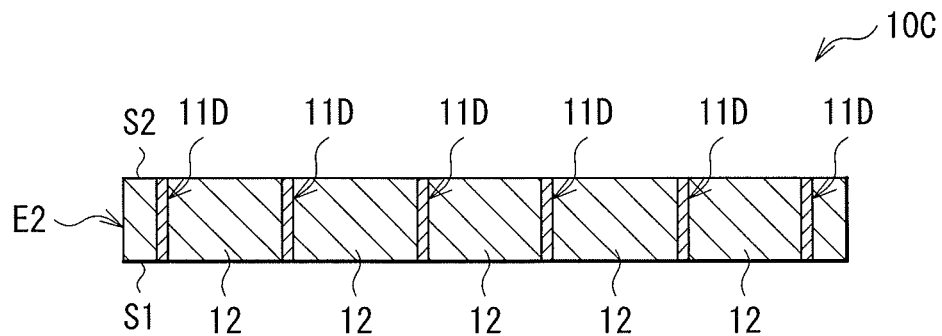
[ FIG. 23 ]
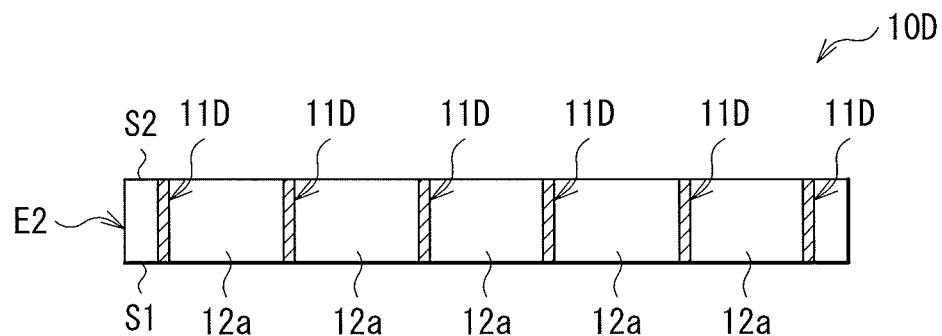
[ FIG. 24 ]
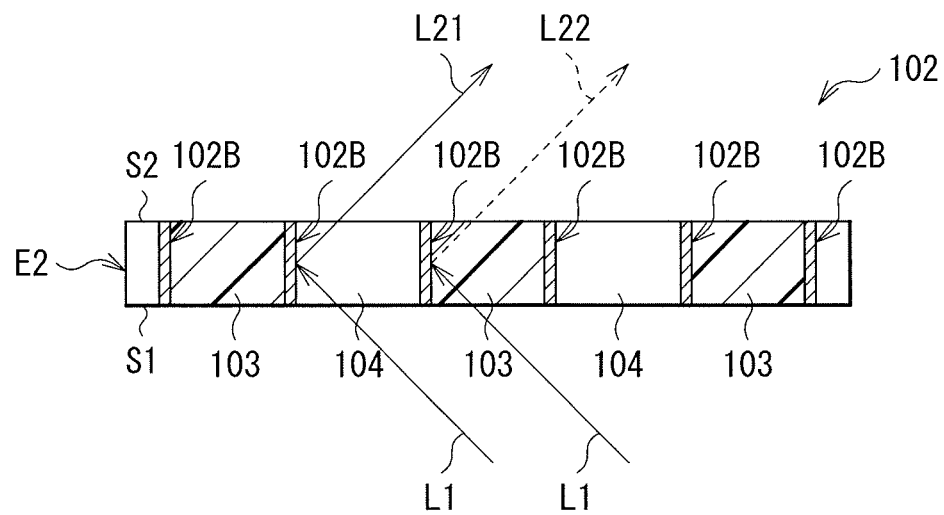

[ FIG. 25 ]
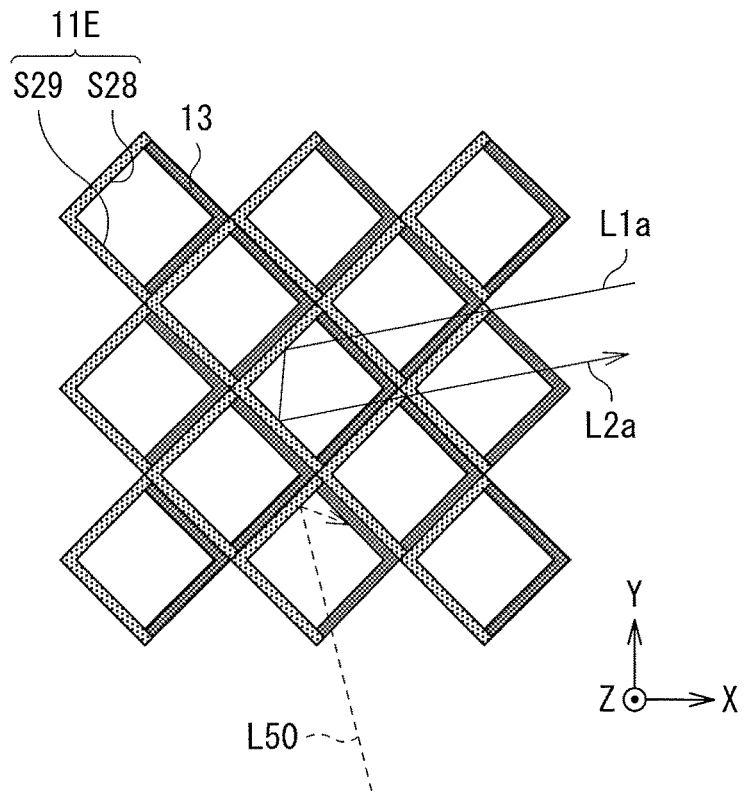
[ FIG. 26 ]
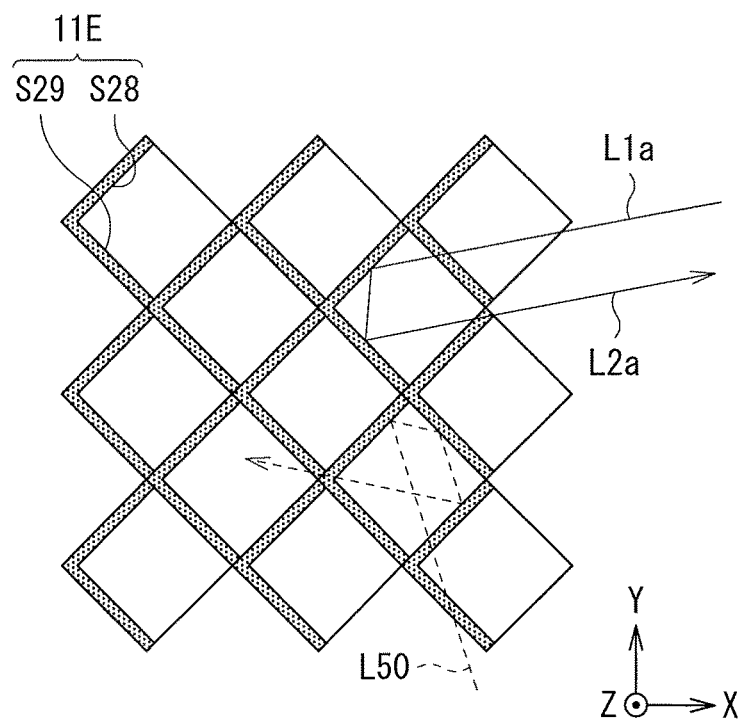

[ FIG. 27 ]
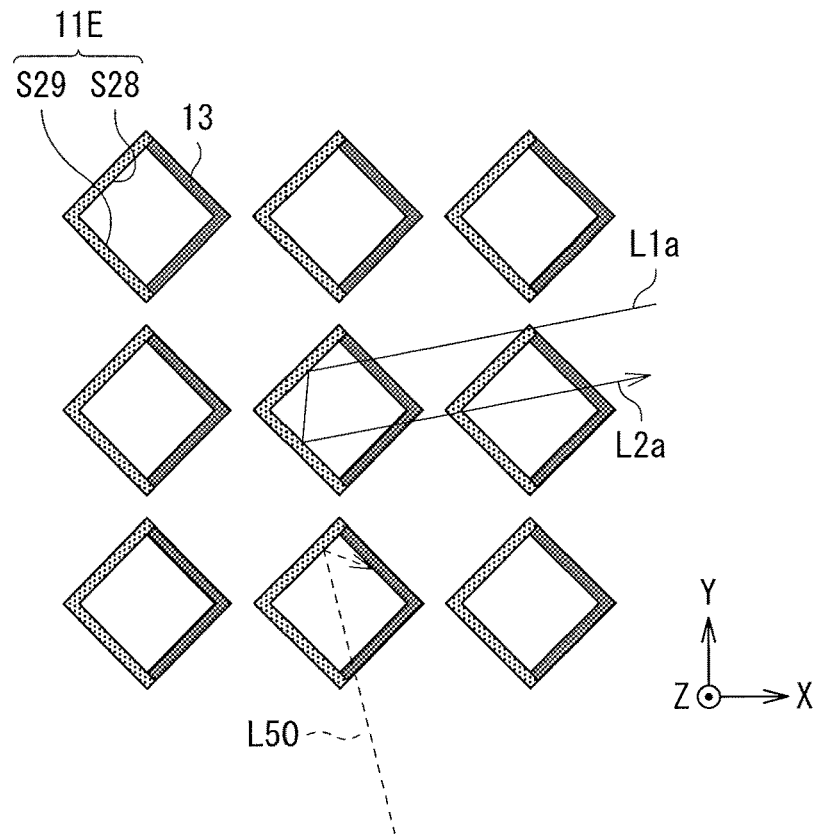
[ FIG. 28 ]
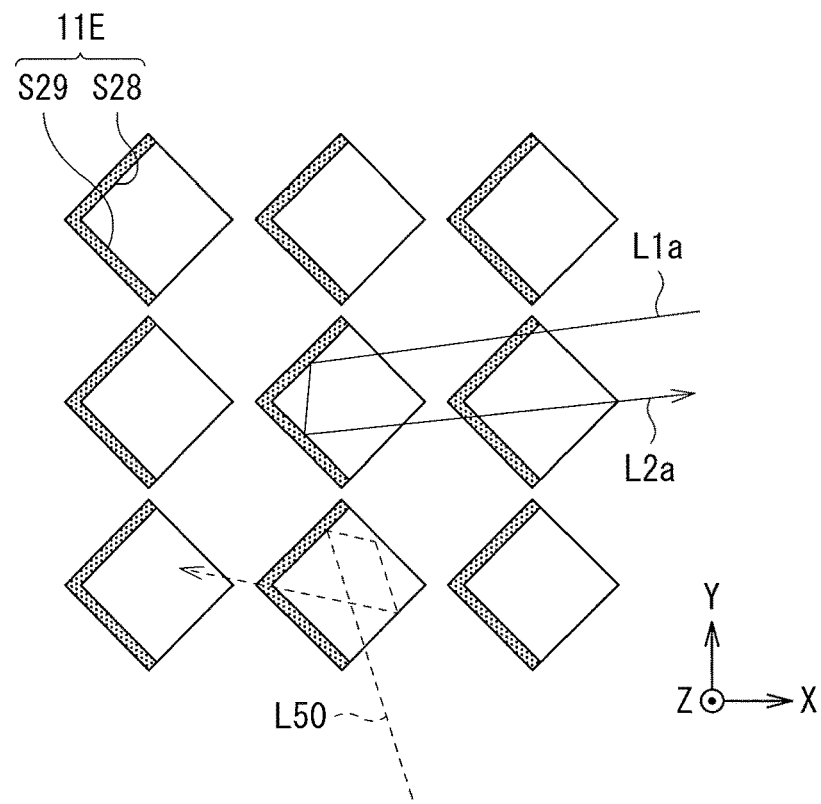

[ FIG. 29 ]
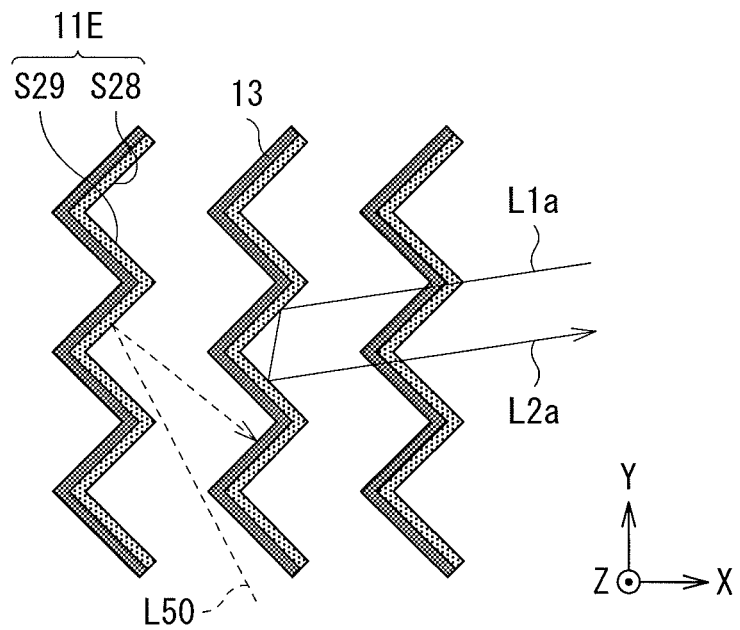
[ FIG. 30 ]
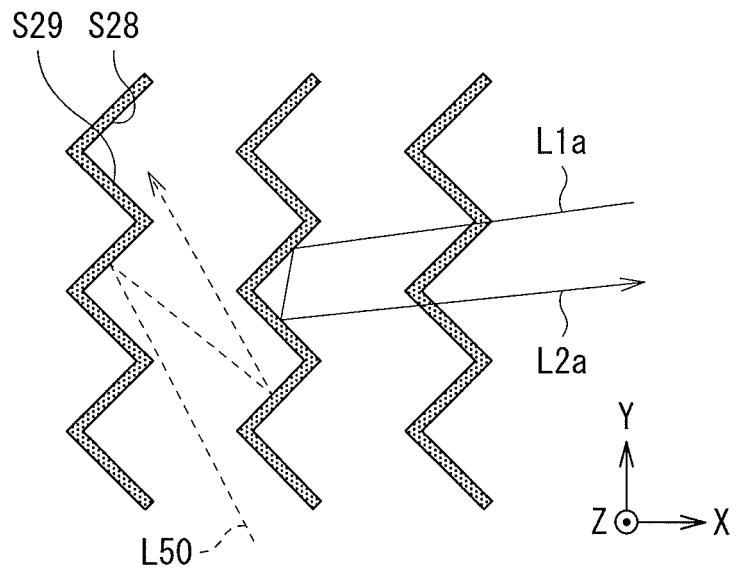

[ FIG. 31 ]
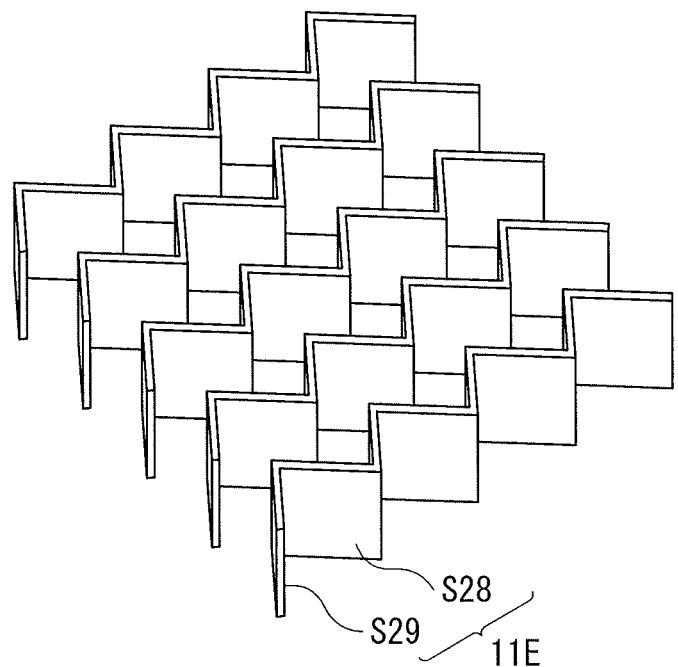
[ FIG. 32A ]
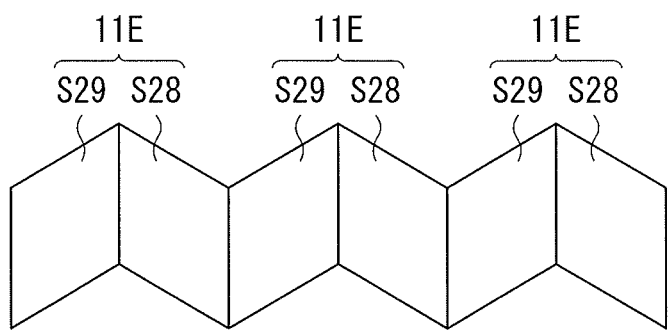
[ FIG. 32B ]
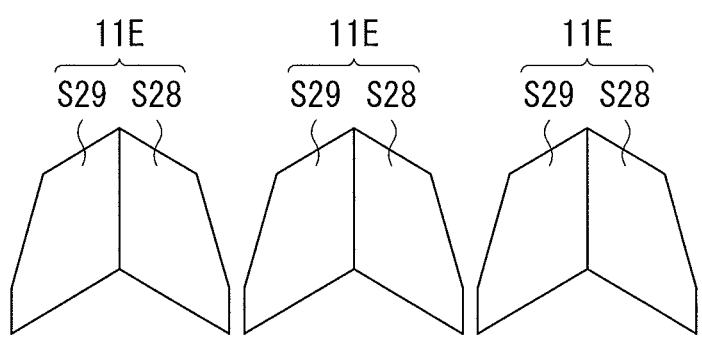

[ FIG. 33 ]
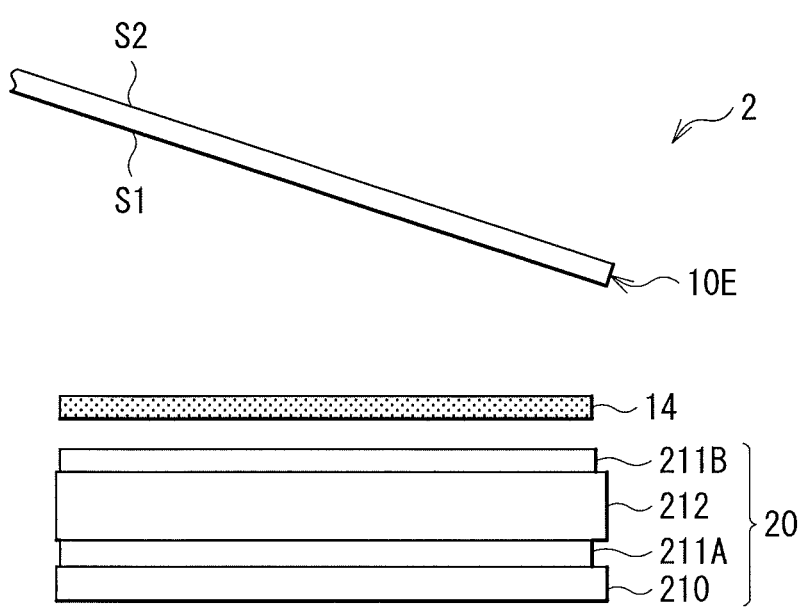

[ FIG. 34A ]
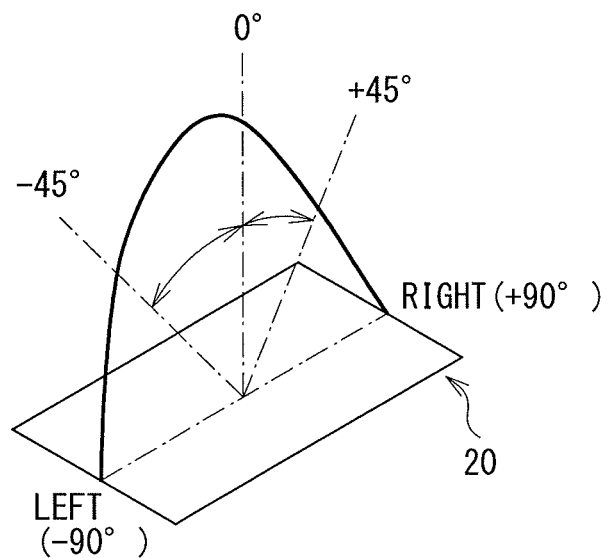
[ FIG. 34B ]
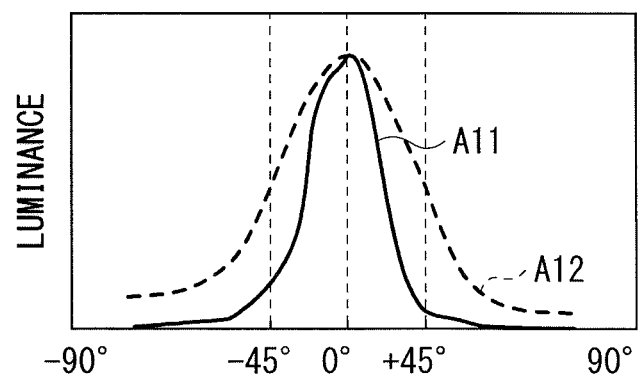

[ FIG. 35A ]
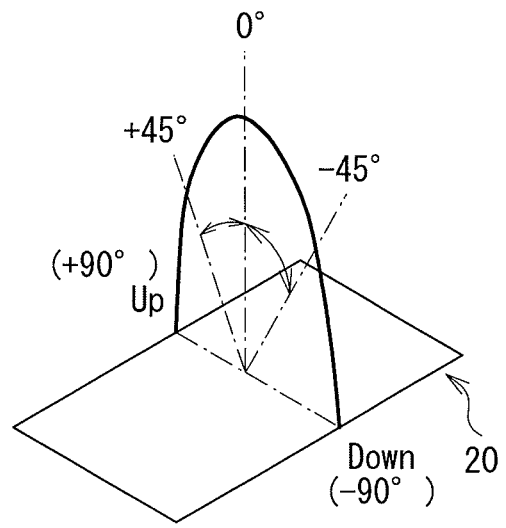
[ FIG. 35B ]
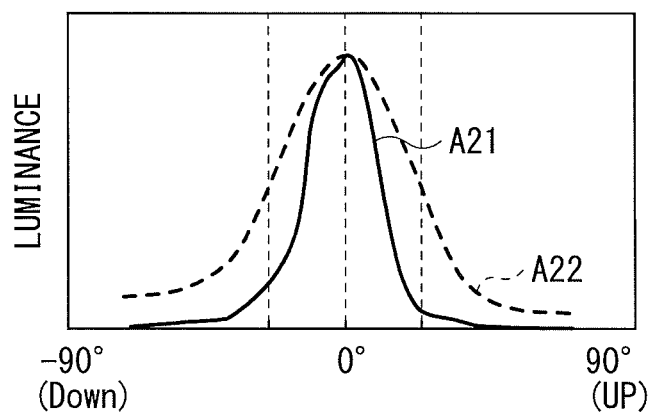

[ FIG. 36A ]
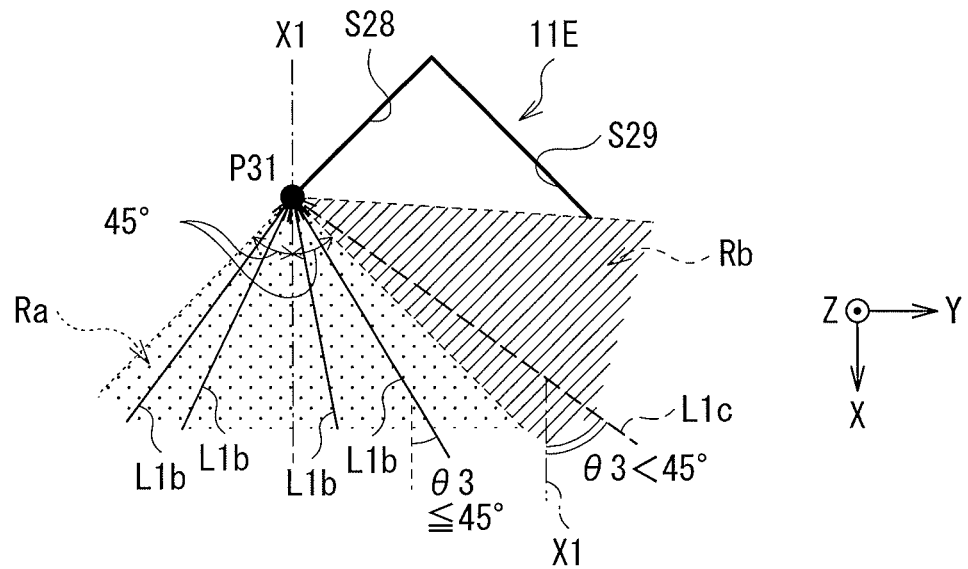
[ FIG. 36B ]
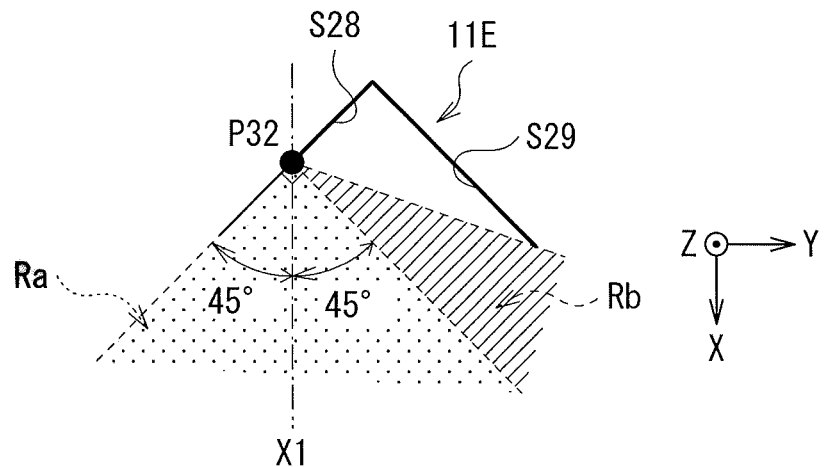
[ FIG. 36C ]
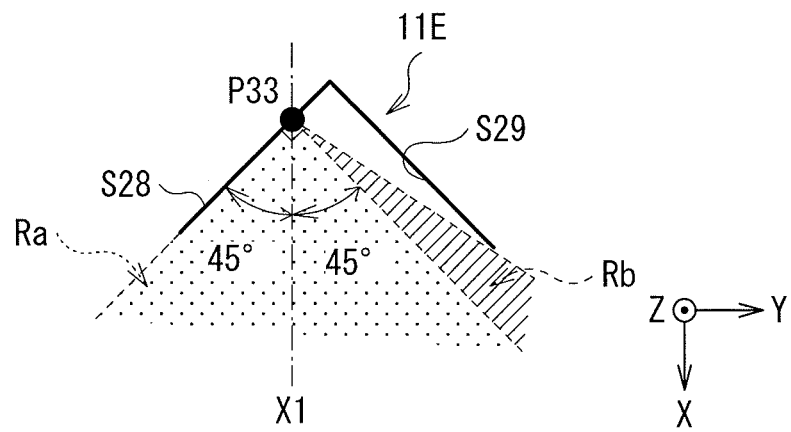

[ FIG. 37 ]
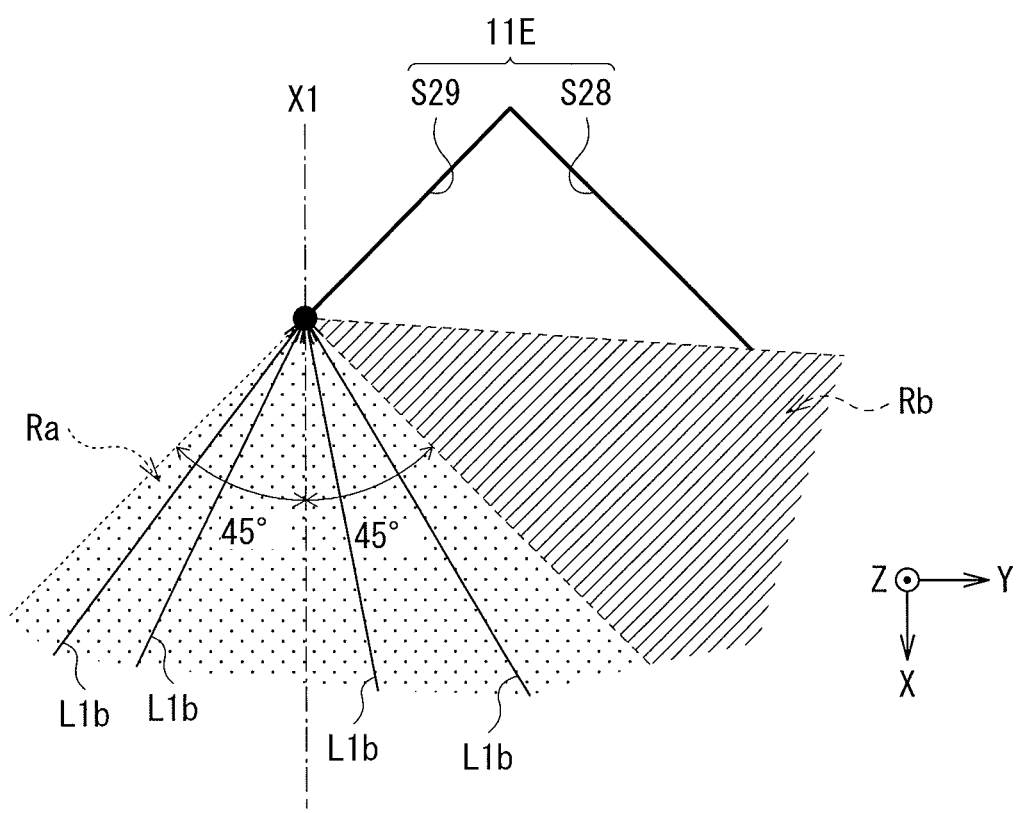

OPTICAL DEVICE AND DISPLAY UNIT

CROSS REFERENCE TO RELATED APPLICATIONS

This application is a U.S. National Phase of International Patent Application No. PCT/JP2016/070575 filed on Jul. 12, 2016, which claims priority benefit of Japanese Patent Application No. JP 2015-147379 filed in the Japan Patent Office on Jul. 27, 2015. Each of the above-referenced applications is hereby incorporated herein by reference in its entirety.

TECHNICAL FIELD

The present disclosure relates to an optical device that forms an image in midair, for example, and to a display unit including such an optical device.

BACKGROUND ART

In recent years, display units that makes it possible to display an image in midair as a real image and provide a stereoscopic vision and a touch input, for example, have been developed (for example, PTL 1). Such a display unit transmits an image displayed on the screen of a display device through an optical device, called a dihedral corner reflector array, thereby forming the image on a predetermined plane in midair.

CITATION LIST

Patent Literature

[PTL 1] Japanese Unexamined Patent Application Publication No. 2013-88556

SUMMARY OF INVENTION

However, in a display unit using an optical device as described above, an imaging plane is provided opposite to a display device with the optical device in between. In this case, spaces having predetermined distances or longer are reserved between the optical device and the display device and between the optical device and the imaging plane. Therefore, this configuration may lead to enlargement of an entire unit.

It is desirable to provide an optical device and a display unit capable of displaying an image in midair while achieving downsizing of an entire unit.

An optical device according to an embodiment of the present disclosure includes: an incidence plane and an output plane facing each other; and a plurality of reflectors that are disposed between the incidence plane and the output plane and each reflect light incident from the incidence plane toward the output plane. Each of the plurality of reflectors has a first reflection surface and a second reflection surface disposed orthogonal to each other, and a line of intersection between the first reflection surface and the second reflection surface being inclined with respect to a normal to the incidence plane.

A display unit according to an embodiment of the present disclosure includes: the optical device according to the foregoing embodiment of the present disclosure; and a display device that displays an image toward this optical device.

In each of the optical device and the display unit according to the embodiments of the present disclosure, the plurality of reflectors each have the first reflection surface and the second reflection surface that are disposed orthogonal to each other. Accordingly, for example, in a case where light outputted from the display device is incident on the incidence plane, after this incident light is reflected by the respective reflectors, the incident light is outputted from the output plane to form an image at a predetermined location above the optical device. In this case, the line of intersection between the first and second reflection surfaces in each of the reflectors is inclined with respect to the normal to the incidence plane, which makes it possible for an incident angle of light incident on the incidence plane to be smaller, as compared with a case where the line is orthogonal. Thus, this makes it possible to decrease a distance between the display device and the optical device.

According to the optical device and the display unit in the foregoing embodiments of the present disclosure, each of the plurality of reflectors has the first and second reflection surfaces disposed orthogonal to each other; therefore, for example, light from the display device forms an image, for example, at a predetermined location in midair. The line of intersection between first and second reflection surfaces in each of the reflectors is inclined with respect to the normal to the incidence plane, which makes it possible to dispose the display device and the optical device close to each other, thereby leading to a decrease in an overall volume of the display unit. Consequently, it is possible to display an image in midair while achieving downsizing of an entire unit.

It is to be noted that the above description is an example of the present disclosure. Effects of the present disclosure are not limited to the above effects, and may be other different effects or may further include other effects.

BRIEF DESCRIPTION OF DRAWINGS

FIG. 1A is a schematic view for use in explaining an outline of an optical device according to a first embodiment of the present disclosure.

FIG. 1B is a block diagram that illustrates a configuration of a display unit including the optical device illustrated in FIG. 1A.

FIG. 2 is an XY-plan view of a configuration of a key part of the optical device illustrated in FIG. 1A.

FIG. 3 is a schematic view for use in explaining a detailed configuration of a reflector illustrated in FIG. 2.

FIG. 4 is a cross-sectional view for use in explaining an example of a method of forming the reflectors illustrated in FIG. 2.

FIG. 5 is a schematic view for use in explaining a detailed configuration of the reflector illustrated in FIG. 2.

FIG. 6A is a schematic cross-sectional view taken along a line A-A' in FIG. 2.

FIG. 6B is a schematic cross-sectional view taken along a line B-B' in FIG. 2.

FIG. 6C is a schematic cross-sectional view taken along a line C-C' in FIG. 2.

FIG. 7 is a schematic view for use in explaining an effect of the optical device and the display unit illustrated in FIGS. 1A and 1B.

FIG. 8A is a schematic view of workings of the reflector positioned near a display device.

FIG. 8B is a schematic view of workings of the reflector positioned away from the display device.

FIG. 9A is an XY-plan view of a configuration of a key part of an optical device according to comparative example 1.

FIG. 9B is a schematic view for use in explaining a detailed configuration of a reflector illustrated in FIG. 9A.

FIG. 10A is a schematic view for use in explaining an image formed in a plane-symmetrical manner by the optical device.

FIG. 10B is a schematic view for use in explaining an image formed in a plane-symmetrical manner by the optical device.

FIG. 11 is a schematic view of a configuration of an entire unit including the optical device illustrated in FIG. 9A and a display device, together with an imaging plane.

FIG. 12 is a schematic view of a configuration of an entire unit including the optical device illustrated in FIG. 2 and the display device, together with an imaging plane.

FIG. 13A is an XY-plan view of a configuration of a key part of an optical device according to modification example 1.

FIG. 13B is a schematic view for use in explaining a detailed configuration of a reflector illustrated in FIG. 13A.

FIG. 14 is a schematic view for use in explaining a detailed configuration of the reflector illustrated in FIG. 13A.

FIG. 15A is a schematic cross-sectional view taken along a line A-A' in FIG. 13A.

FIG. 15B is a schematic cross-sectional view taken along a line B-B' in FIG. 13A.

FIG. 15C is a schematic cross-sectional view taken along a line C-C' in FIG. 13A.

FIG. 16 is a cross-sectional view of a configuration of an optical device according to modification example 2.

FIG. 17 is a schematic view of a configuration of an entire unit including an optical device according to comparative example 2 and the display device, together with an imaging plane.

FIG. 18 is a schematic view of a configuration of an entire unit including the optical device illustrated in FIG. 16 and the display device, together with an imaging plane.

FIG. 19 is a perspective view of a configuration of a key part of an optical device according to modification example 3.

FIG. 20 is a schematic view of workings of a reflector in an optical device according to comparative example 3.

FIG. 21 is a schematic view of workings of a reflector in the optical device illustrated in FIG. 19.

FIG. 22 is a cross-sectional view of a configuration of a key part of an optical device according to a first configuration example of modification example 4.

FIG. 23 is a cross-sectional view of a configuration of a key part of an optical device according to a second configuration example of modification example 4.

FIG. 24 is a cross-sectional view for use in explaining workings of an optical device according to comparative example 4.

FIG. 25 is a plan view of a configuration of a key part of an optical device according to a second embodiment.

FIG. 26 is a plan view of a configuration of a key part of an optical device according to comparative example 5.

FIG. 27 is a plan view of a configuration of a key part of an optical device according to modification example 5.

FIG. 28 is a plan view of a configuration of a key part of an optical device according to comparative example 6.

FIG. 29 is a plan view of a configuration of a key part of an optical device according to modification example 6.

FIG. 30 is a plan view of a configuration of a key part of an optical device according to comparative example 7.

FIG. 31 is a perspective view of a configuration of a reflector in the optical device illustrated in FIG. 29.

FIG. 32A is a schematic view for use in explaining a first configuration example of the reflector illustrated in FIG. 31.

FIG. 32B is a schematic view for use in explaining a second configuration example of the reflector illustrated in FIG. 31.

FIG. 33 is a schematic view of a configuration of a key part of a display unit according to a third embodiment.

FIG. 34A is a schematic view for use in explaining a function of an optical direction control film illustrated in FIG. 33 in a horizontal direction of a screen.

FIG. 34B is a characteristic view of luminance related to FIG. 34A.

FIG. 35A is a schematic view for use in explaining a function of the optical direction control film illustrated in FIG. 33 in a vertical direction of the screen.

FIG. 35B is a characteristic view of luminance related to FIG. 35A.

FIG. 36A is a schematic view for use in explaining a return or no return of reflected light in an optical device in relation to its incidence angle.

FIG. 36B is a schematic view for use in explaining a return or no return of reflected light in the optical device in relation to its incidence angle.

FIG. 36C is a schematic view for use in explaining a return or not return of reflected light in the optical device in relation to its incidence angle.

FIG. 37 is a schematic view for use in explaining light incident on a reflector in the display unit illustrated in FIG. 33.

MODES FOR CARRYING OUT THE INVENTION

Some embodiments of the present disclosure will be described in detail with reference to the accompanying drawings. The description will be given in the following order.

1. First embodiment (an example of an optical device in which a cross line between two adjacent reflection surfaces is disposed so as to be inclined with respect to an incidence plane, and an example of a display unit including this optical device)

2. Modification Example 1 (an example in which one of two reflection surfaces is disposed so as to be inclined and the other is disposed vertically)

2. Modification Example 2 (an example in which the intervals between reflectors vary with distance from an end)

3. Modification Example 3 (an example in which two reflection surfaces are alternately arranged in lines while being joined together)

4. Modification Example 4 (an example in which resin layers or air layers are provided in the respective regions between reflection surfaces)

5. Second embodiment (an example in which functional layers having a function of absorbing or diffusing light are provided on the surfaces opposite to reflection surfaces)

6. Modification Examples 5 and 6 (examples of other configurations of reflectors and functional layers)

7. Third embodiment (an example in which an optical direction control film is disposed between a display device and an optical device)

First Embodiment

[Configuration]

FIG. 1A is a view for use in explaining an outline of an optical device (optical device 10) according to a first embodiment of the present disclosure. FIG. 1B illustrates a configuration of a display unit (display unit 1) including the optical device 10. The optical device 10 is an optical image forming element that includes a plurality of tiny mirrors (reflectors 11). Specifically, the optical device 10 is so configured as to use light outputted from a point P (point light source) under an incidence plane S1 to form an image at a point Q (point Q in midair) above an output plane S2.

The display unit 1 includes a display device 20 on the incidence plane S1 side of the optical device 10. Any of various displays may be used as the display device 20. Examples of the displays include an organic EL (Electro-Luminescence) display, a liquid crystal display, an electrophoretic display, and the LED (Light Emitting Diode) display. For example, this display device 20 is disposed at a predetermined location below the optical device 10. Specifically, the display device 20 is disposed such that light outputted from the display device 20 is incident on each of the reflectors 11 in the optical device 10 from obliquely below. One or both of the display device 20 and the optical device 10 may be rotatable around an axis extending in a Z direction (may be equipped with a rotary drive mechanism). Rotating one or both of the display device 20 and the optical device 10 in this manner enables a user to observe an image from multiple points of view (multiple directions).

[Detailed Configuration of Optical Device 10]

FIG. 2 illustrates an XY-planar configuration of the optical device 10. FIG. 3 illustrates a perspective configuration of the reflector 11 and the incidence plane S1. The optical device 10 is a so-called dihedral corner reflector array, for example. The optical device 10 includes the plurality of reflectors 11 between the incidence plane S1 and the output plane S2. The reflectors 11 are two-dimensionally arranged in a matrix fashion in plan view (within an XY plane). It is to be noted that the output plane S2 is not illustrated in FIGS. 2 and 3.

Each of the plurality of reflectors 11 is a mirror that reflects light incident from the incidence plane S1 once or multiple times (such as twice), thereby guiding the light to the output plane S2. The number, locations, size, and the like of the reflectors 11 disposed in the optical device 10 are not limited to specific values. However, for example, a size of the reflectors 11 influences a resolution of an image to be displayed in midair. Each of the reflectors 11 has two reflection surfaces S21 and S22 (first and second reflection surfaces) that are adjacent to each other. The reflection surfaces S21 and S22 are disposed so as to be orthogonal to each other on a linear cross line CL. More specifically, a normal to the reflection surface S21 forms an angle of about 90° with a normal to the reflection surface S22. It is to be noted that the reflection surfaces S21 and S22 may be disposed with their sides being in connection (contact) with each other on the cross line CL or may intersect with each other on the cross line CL. Alternatively, the reflection surfaces S21 and S22 may be separated from each other, and a tiny gap may be provided between the two reflection surfaces. Moreover, the reflection surfaces S21 and S22 are orthogonal to each other; however, it is only necessary for the angle between the normals to reflection surfaces S21 and S22 to be about 90°, for example, in a range of 90°±1°.

Each of the reflection surfaces S21 and S22 includes a metal thin film, for example. The metal thin film of the reflection surfaces S21 and S22 includes, for example, metal having light reflectivity, such as aluminum or silver. The reflection surfaces S21 and S22 are formed by, for example, the following process. In other words, as illustrated in FIG. 4, first, pillars (projections) 121 including a resin, etc. are formed on a substrate 120 including, for example, glass, a resin, etc., and thereafter, a metal thin film 122 is formed on a side surface of each of the pillars 121 with use of, for example, an evaporation method, a sputtering method, or the like. For example, the surface of each metal thin film 122 is coated with a film or is subjected to mirror finishing, such as a polishing, as necessary. It is possible to form each pillar 121 with use of any of various molding methods, such as injection molding, extrusion molding, vacuum molding, rotational molding, laminating molding, blow molding, and calendar molding. Moreover, in addition to this, it is possible to process each pillar 121 by a cutting technique or a lithography technique using laser light. Further, in this example, each of the reflection surfaces S21 and S22 is formed using the pillar, but another method that does not involve using pillars is employed. For example, a plurality of via-holes (through-holes) may be formed in a planar substrate, and thereafter, the inner sides of the via holes may be subjected to mirror finish to form the reflection surfaces S21 and S22.

It is to be noted that in the optical device 10, it is sufficient that a portion (one of right and left sides) of each pillar 121 is covered with the metal thin film 122, as illustrated in FIG. 4. The metal thin film 122 may or may not be provided on the remaining side of each pillar 121. In other words, it is sufficient that at least two adjacent reflection surfaces S21 and S22 are formed using side surfaces of structures such as the pillars 121. Note that it is more preferable that only two adjacent surfaces be provided as the reflection surfaces, which makes it possible to suppress multipath reflection. In addition, for example, air layers 123 are provided in regions between the reflectors 11, that is regions between the pillars 121.

In this embodiment, the cross line CL between the reflection surfaces S21 and S22 is inclined with respect to a normal to the incidence plane S1 (the reflection surfaces S21 and S22 are disposed such that the cross line CL is inclined with respect to the normal to the incidence plane S1). FIG. 5 illustrates a planar configuration of one reflector 11 and the incidence plane S1 in an enlarged manner. FIG. 6A illustrates a cross-sectional configuration taken along a line A-A' in FIG. 2. FIG. 6B illustrates a cross-sectional configuration taken along a line B-B' in FIG. 2. FIG. 6C illustrates a cross-sectional configuration taken along a line C-C' in FIG. 2.

Each of the reflection surfaces S21 and S22 is disposed while being inclined with respect to the incidence plane S1. The cross line CL is inclined so as to form a predetermined angle $\theta 1$ with the normal to the incidence plane S1 (the Z direction). The angle $\theta 1$ is not limited to a specific value but satisfies $0°<\theta 1 \leq 30°$, for example. An angle $\theta 2$ that a line of intersection between the reflection surface S21 and the incidence plane S1 forms with a line of intersection between the reflection surface S22 and the incidence plane S1 (that the reflection surface S21 forms with the reflection surface S22 in a plane parallel to the incidence plane S1) is an acute angle (less than 90°) or 90°, for example.

Since the reflection surfaces S21 and S22 are inclined with respect to the incidence plane S1, both the reflection surfaces S21 and S22 are disposed so as to face directly upward (toward the output plane S2) along the Z direction, as illustrated in FIG. 5. Moreover, in cross-sectional views, the cross lines CL and the reflection surfaces S21 and S22 are all inclined, as illustrated in FIGS. 6A to 6C. Each of the cross line CL, the reflection surface S21, and the reflection surface S22 has, for example, a constant inclined angle in the plurality of reflectors 11.

[Workings and Effects]

In the display unit 1 according to this embodiment, as illustrated in FIG. 7, in a case where an image 20a is displayed on the display device 20 that is disposed obliquely below the incidence plane S1 of the optical device 10, light L1 based on the image 20a is incident on the optical device 10 from the incidence plane S1. Since the optical device 10 is provided with the plurality of reflectors 11 arranged in an array fashion, the light L1 is dividedly incident on each of the reflectors 11, and thereafter the light L1 is reflected by the reflectors 11 to be guided to the output plane S2 and be outputted as light L2 from the output plane S2.

In the optical device 10 here, each of the reflectors 11 includes the two reflection surfaces S21 and S22 disposed adjacent to each other. Thus, in a case where a light beam L1a contained in the light L1 is incident on one of the reflectors 11, the light beam L1a is reflected twice, for example, by the reflection surfaces S21 and S22 and then is outputted from the reflector 11 as a light beam L2a, for example, as illustrated in FIGS. 8A and 8B. It is to be noted that FIG. 8A schematically illustrates a path of a light beam in the reflector 11 disposed close to the display device 20 of the reflectors 11 two-dimensionally arranged in the optical device 10, and FIG. 8B schematically illustrates a path of a light beam in the reflector 11 disposed away from the display device 20.

Specifically, after the light beam L1a that is outputted from the point P (the display device 20) passes through the incidence plane S1, the light beam L1a is reflected at a point P11 by the reflection surface S21 and thereafter is reflected at a point P12 by the reflection surface S22 to be guided to the output plane S2 (not illustrated in FIG. 8A), as illustrated in FIG. 8A. In this way, the light beam L2a is outputted from the reflector 11 to a point Q (imaging plane 30) in midair. In this case, within the XY plane, the light beam L1a incident on the optical device 10 is sequentially reflected by the reflection surfaces S21 and S22 and goes back (is returned) to substantially the same direction as an incidence direction. In the example illustrated in FIG. 8B, likewise, after the light beam L1a that is outputted from the display device 20 at the point P passes through the incidence plane S1, the light beam L1a is reflected at a point P21 by the reflection surface S21, and thereafter is reflected at a point P22 by the reflection surface S22 to be guided to the output plane S2 (not illustrated in FIG. 8B). In this way, the light beam L2a is outputted from the reflector 11 to the point Q (imaging plane 30) in midair. As described above, the incidence angle of the light beam L1a and the output angle of the light beam L2a vary with an in-plane location of each reflector 11. However, the reflector 11 disposed at any location delivers a light beam outputted from the one point P to the one point Q.

In the above way, the light L2 passes through the reflectors 11 in the optical device 10 and then forms an image in midair (or forms the imaging plane 30). In this case, the light L1 and the light L2 based on the image 20a pass through the optical device 10 to form an image, thereby displaying an object (the image 20a) in midair as a real image. This differs from a typical mirror by which an object is observed as a virtual image. For this reason, the display unit 1 according to this embodiment is applicable to various UIs (user interfaces). As an example, providing a light source that emits invisible light, such as near infrared rays, to a region in proximity to the imaging plane 30 and providing a function of detecting this invisible light to a unit make it possible to realize a touch input etc. to an image formed in midair.

Moreover, in this embodiment, a light beam is reflected twice by each reflector 11 in the optical device 10 to pass through the optical device 10. In this case, an optimum observation direction of a resultant image is a direction inclined at about 30° to about 50° with respect to a vertical direction. In other words, for example, a user sees the output plane S2 at a predetermined location obliquely above the optical device 10, which allows the user to observe an image floating in midair.

Here, FIGS. 9A and 9B each illustrate a configuration of a key part of an optical device 100A according to a comparative example (comparative example 1) of this embodiment. FIG. 9A illustrates an XY-planar configuration of the optical device 100A. FIG. 9B illustrates a detailed configuration of one reflector 100 and the incidence plane S1. In this way, comparative example 1 is similar to this embodiment in that the one reflector 100 has two reflection surfaces S100 that are adjacent to each other. However, in comparative example 1, the two reflection surfaces S100 are disposed perpendicular to the incidence plane S1, and the two reflection surfaces S100 are orthogonal to each other. In other words, a cross line between the two reflection surfaces S100 is along the Z axis perpendicular to the incidence plane S1, and a line of intersection between one of the two adjacent reflection surfaces S100 and the incidence plane S1 forms an angle of about 90° with a line of intersection between the other of the two adjacent reflection surfaces S100 and the incidence plane S1.

Even in comparative example 1, light incident on the reflector 100 is reflected twice, for example, by the two reflection surfaces S100 and then is outputted. In this case, as illustrated in FIG. 10A, within a plane parallel to the incidence plane S1, the incident light beam L1a is sequentially reflected by the two reflection surfaces S100 and goes back (is returned) to substantially the same direction as the incidence direction. Specifically, the light beam L2a to be outputted from the output plane S2 travels in a direction opposite to a travel direction of the light beam L1a, within the plane parallel to the incidence plane S1. However, the light beams L1a and L2a do not undergo any change in an axial direction perpendicular to the incidence plane S1. This means that a path along which light L1 (the light beam L1a) travels is plane-symmetrical to a path along which light L2 (the light beam L2a) travels, with respect to the optical device 100A, as schematically illustrated in FIG. 10B. All the paths along which the light beams L1a and L2a travel in the reflectors 100 have this plane symmetry. The light L1 and the light L2 based on the image 20a pass through the optical device 10 to form an image. Thus, real images Pa and Pb of the image 20a are formed, as real images Pa' Pb', at locations that are plane-symmetrical to the display device 20 with respect to the optical device 10.

As described above, in comparative example 1, the light L2 forms an image (the imaging plane 30) at a location that is plane-symmetrical to the display device 20 with respect to the optical device 100A, as illustrated in FIG. 11.

However, in a case where the optical device 100A according to comparative example 1 is used, the imaging plane 30 is formed at a location that is symmetrical to the display device 20 with respect to the optical device 100A, as described above. This means that it is necessary to also reserve, between the optical device 100A and the imaging plane 30, a distance that is equal to a distance (a1) between the optical device 100A and the display device 20. In other words, in comparative example 1, an incidence angle on the incidence plane S1 is equal to magnitude (θa1) of an output angle from the output plane S2. For this reason, use of the optical device 100A according to comparative example 1 easily results in enlargement of an entire unit including the display device 20 and the imaging plane 30.

Accordingly, in this embodiment, the cross line CL between the reflection surfaces S21 and S22 in each of the reflectors 11 in the optical device 10 is inclined with respect to the normal to the incidence plane S1. In this case, for example, an incidence angle θa2 at which the light L1 from the display device 20 is incident on the incidence plane S1 becomes smaller (θa2<θa1), as compared with the above-described comparative example 1, as illustrated in FIG. 12. It is to be noted that an output angle at which the light L2 is outputted from the output plane S2 is equal to the output angle (θa1) in comparative example 1. In short, the distance (a2) between the display device 20 and the optical device 10 becomes smaller (a2<a1), which makes it possible to reduce a volume of the entire unit, as compared with comparative example 1.

In this embodiment, as described above, each of the plurality of reflectors 11 two-dimensionally arranged in the optical device 10 has reflection surfaces S21 and S22 that are adjacent to each other, which causes, for example, incident light from the display device 20 to form an image in midair at a predetermined location. The cross line CL between the reflection surfaces S21 and S22 in each of the reflectors 11 is inclined with respect to the normal to the incidence plane S1, which makes it possible to decrease the distance between the display device 20 and the optical device 10. This means that it is possible to dispose the display device 20 and the optical device 10 close to each other, thereby decreasing an entire volume of the display unit 1. Consequently, it is possible to display an image in midair while achieving downsizing of the entire unit.

Some modification examples of the foregoing first embodiment and other embodiments will be described below. Hereinafter, constituent elements that are similar to those in the foregoing first embodiment are denoted with the same reference numerals, and description thereof will be omitted as appropriate.

Modification Example 1

[Configuration]

FIG. 13A illustrates an XY-planar configuration of an optical device according to modification example 1. FIG. 13B illustrates a perspective configuration of one reflector (reflector 11A) and the incidence plane S1. The optical device according to this modification example is, for example, a so-called dihedral corner reflector array as with the foregoing first embodiment. The optical device according to this modification example includes a plurality of reflectors 11A two-dimensionally arranged in an array fashion between the incidence plane S1 and the output plane S2. It is to be noted that the output plane S2 is not illustrated in FIGS. 13A and 13B.

Each of the plurality of reflectors 11A is a mirror that reflects light incident from the incidence plane S1 once or multiple times (such as twice), thereby guiding the light to the output plane S2, as with the reflectors 11 according to the foregoing first embodiment. Each of the reflectors 11A has two reflection surfaces S23 and S24 that are adjacent to each other. The reflection surfaces S23 and S24 are disposed so as to intersect (are in contact) with each other on the linear cross line CL. It is to be noted that the reflection surfaces S23 and S24 may be disposed with their side surfaces in connection with each other on the cross line CL or may be disposed so as to intersect with each other on the cross line CL. Each of the reflection surfaces S23 and S24 includes, for example, a metal thin film including, for example, metal having light reflectivity, such as aluminum and silver. It is possible to form each of the reflection surfaces S23 and S24 by a process similar to that used to form the reflection surfaces S21 and S22 in the foregoing first embodiment.

Even in this modification example, the cross line CL between the reflection surfaces S23 and S24 is inclined with respect to the normal to the incidence plane S1 (the reflection surfaces S23 and S24 are disposed such that the cross line CL is inclined with respect to the normal to the incidence plane S1), as with the foregoing first embodiment. FIG. 14 illustrates a planar configuration of one reflector 11A and the incidence plane S1 in an enlarged manner. FIG. 15A illustrates a cross-sectional configuration taken along a line A-A' in FIG. 13A. FIG. 15B illustrates a cross-sectional configuration taken along a line B-B' in FIG. 13A. FIG. 15C illustrates a cross-sectional configuration taken along a line C-C' in FIG. 13A.

This modification example, however, differs from the foregoing first embodiment in that one (the reflection surface S23 in this example) of the reflection surfaces S23 and S24 is disposed so as to be inclined with respect to the incidence plane S1, whereas the other (the reflection surface S24 in this example) is disposed perpendicular to the incidence plane S1. The cross line CL is inclined at a predetermined angle θ1 with respect to the normal to the incidence plane S1 (the Z direction). An angle that a line of intersection between the reflection surface S23 and the incidence plane S1 forms with a line of intersection between the reflection surface S24 and the incidence plane S1 (that the reflection surface S23 forms with the reflection surface S24 in a plane parallel to the incidence plane S2) is, for example, 90°.

Since the reflection surface S23 of the reflection surfaces S23 and S24 is inclined with respect to the incidence plane S1, the reflection surface S23 is disposed so as to face directly upward (toward the output plane S2) along the Z direction, as illustrated in FIG. 14. Moreover, in cross-sectional views, the cross lines CL and the reflection surfaces S23 are disposed so as to be inclined, as illustrated in FIGS. 15A to 15C. Each of the cross line CL and the reflection surface S23 has, for example, a constant inclined angle in the plurality of reflector 11A. The reflection surfaces S24 in the plurality of reflectors 11A are disposed perpendicularly.

[Workings and Effects]

As with the optical device 10 according to the foregoing first embodiment, the optical device according to this modification example causes light based on an image displayed on the display device 20 to be reflected by the reflectors 11A and pass therethrough, which makes it possible to form the image upward the optical device.

Moreover, the cross line CL between the reflection surfaces S23 and S24 in each of the reflectors 11A is inclined with respect to the normal to the incidence plane S1. Accordingly, an incidence angle on the incidence plane S1 from the display device 20 becomes smaller, as with the foregoing first embodiment. In other words, the distance between the display device 20 and the optical device 10 becomes smaller, thereby reducing the volume of the entire device. In short, it is possible for this modification example to achieve effects similar to those of the foregoing first embodiment.

Modification Example 2

[Configuration]

FIG. 16 illustrates a configuration of a key part of an optical device (optical device 10A) according to modification example 2. The optical device 10A is also, for example, a so-called dihedral corner reflector array as with the optical device 10 according to the foregoing first embodiment. The optical device 10A includes a plurality of reflectors 11B two-dimensionally arranged in an array fashion between the incidence plane S1 and the output plane S2.

Each of the plurality of reflectors 11B is a mirror that reflects light incident from the incidence plane S1 once or multiple times (such as twice), thereby guiding the light to the output plane S2, as with the reflectors 11 according to the foregoing first embodiment. Each of the reflectors 11B has two reflection surfaces that are adjacent to each other. In this modification example, the cross line CL (not illustrated in FIG. 16) between two reflection surfaces in each of the reflectors 11B may be inclined with respect to the incidence plane S1. Alternatively, the cross line CL may not be inclined with respect to the incidence plane S1 (may be perpendicular to the incidence plane S1). Herein, a case where the cross line CL between the reflection surfaces in each of the reflectors 11B is perpendicular to the incidence plane S1, and an angle that a line of intersection between one of the reflection surfaces and the incidence plane S1 forms with an line of intersection between the other of the reflection surfaces and the incidence plane S1 is, for example, 90° is exemplified as an example. Each of the reflection surfaces according to this modification example also includes a metal thin film formed by a process similar to that used in the foregoing first embodiment.

In the optical device 10A according to this modification example, unlike the foregoing first embodiment, intervals between the adjacent reflectors 11B are set to be larger at an end E2 (second end) than at one end E1 (first end) of a plane of the optical device 10A. The end E2 is away from the end E1. More specifically, the intervals sequentially vary from the end E1 toward the end E2 (d11<d12<d13<d14<d15<d16). In this modification example, as described above, an array pitch of the reflectors 11B varies depending on locations within a plane of the optical device 10A.

Here, as with the foregoing first embodiment, the display device 20 is disposed at a predetermined location below the optical device 10A, which causes light to be incident on each of the reflectors 11B in the optical device 10A from obliquely below. For example, the end E1 is a portion, facing the display device 20 and disposed closest to the display device 20, of the optical device 10A. For example, the end E2 is a portion, not facing the display device 20 and disposed away from the display device 20. In the optical device 10A, for example, the intervals between the reflectors 11B increase in a sequential (stepwise) manner with distance from the end E1. In a case where a planar shape of the optical device 10A is rectangular or square, for example, each of the ends E1 and E2 is a portion corresponding to a corner or a portion of a side.

[Workings and Effects]

As with the optical device 10 according to the foregoing first embodiment, the optical device 10A according to this modification example causes light based on an image displayed on the display device 20 to be reflected by the reflectors 11B and pass therethrough, which makes it possible to form the image upward the optical device 10A.

Here, FIG. 17 schematically illustrates an optical device (optical device 101) according to comparative example 2 together with the display device 20 and the imaging plane 30. In the optical device 101 according to comparative example 2, a plurality of reflectors 101B are arranged at regular intervals. In each of the reflectors 101B, two reflection surfaces are disposed so as to be orthogonal to each other and be perpendicular to an incidence plane S1. In the optical device 101 configured above, in a region close to the display device 20 (a region close to an end E1), the light L1 incident on the reflectors 101B passes through the optical device 101 and then is delivered to the imaging plane 30. In contrast, in a region away from the display device 20 (a region close to an end E2), the light L1 incident on the reflectors 101B is blocked by adjacent reflectors 101B; therefore, it is difficult to deliver the light L1 to the imaging plane 30 (a small amount of light is delivered to the imaging plane 30). As a result, luminance efficiency is lowered to darken an image to be displayed in midair, thereby resulting in degradation in image quality.

In this modification example, in contrast, the intervals between the adjacent reflectors 11B are set to be larger at the end E2 than that at the end E1 of the plane of the optical device 10A. Herein, the intervals between the adjacent reflectors 11B sequentially increase from the end E1 toward the end E2. Accordingly, the incident light L1 is less prone to be blocked by the adjacent reflectors 11B in the region away from the display device 20 (the region close to the end E2), as illustrated in FIG. 18. This makes it possible to control a decrease in the amount of light to be delivered to the imaging plane 30, thereby maintaining brightness of an image to be displayed in midair.

Moreover, in a case where the cross line CL between two reflection surfaces in each of the reflectors 11B is inclined with respect to the incidence plane S1 in a manner similar to that in the foregoing first embodiment, it is possible to decrease the distance between the optical device 10A and the display device 20, thereby achieving effects similar to those in the foregoing first embodiment.

Modification Example 3

[Configuration]

FIG. 19 illustrates a configuration of a key part of reflectors in an optical device according to modification example 3. The optical device according to this modification example is also, for example, a so-called dihedral corner reflector array as with the optical device 10 according to the foregoing first embodiment. The optical device includes a plurality of reflectors 11C two-dimensionally arranged in an array fashion between the incidence plane S1 and the output plane S2 (which are not illustrated in FIG. 19).

Each of the plurality of reflectors 11C is a mirror that reflects light incident from the incidence plane S1 once or multiple times (such as twice), thereby guiding the light to the output plane S2, as with the reflectors 11 according to the foregoing first embodiment. Each of the reflectors 11C has two reflection surfaces (reflection surfaces S26 and S27) that are adjacent to each other. In this modification example, the cross line CL between the reflection surfaces S26 and S27 may be inclined with respect to the incidence plane S1. Alternatively, the cross line CL may not be inclined with respect to the incidence plane S1 (may be perpendicular to the incidence plane S1). Herein, a case where the cross line CL between the reflection surfaces S26 and S27 in each of the reflectors 11C is perpendicular to the incidence plane S1, and an angle that a line of intersection between the reflection surface S26 and the incidence plane S1 forms with a line of intersection between the reflection surface S27 and the incidence plane S1 is, for example, 90° is exemplified as an example. Each of the reflection surfaces S26 and S27 also include a metal thin film formed by a process similar to that used in the foregoing first embodiment.

It is to be noted that this modification example differs from the foregoing first embodiment in that the plurality of reflectors 11C constitute linear structures (structures 11C1) in which reflection surfaces S26 and S27 are alternately arranged in an X direction (first direction) while being joined together. Each of the structures 11C1 has a zigzag shape within an XY plane. In the optical device according to this modification example, a plurality of structures 11C1 are arranged in a Y direction (second direction) that is orthogonal to the X direction.

[Workings and Effects]

As with the optical device 10 according to the foregoing first embodiment, the optical device according to this modification example also causes light based on an image displayed on the display device 20 to be reflected by the reflectors 11C and pass therethrough, which makes it possible to form the image in midair.

Furthermore, the following effect is achievable. Here, FIG. 20 illustrates a perspective configuration of one reflector in an optical device and the incidence plane S1 according to comparative example 3. Reflectors according to comparative example 3 each have two reflection surfaces S100 that are adjacent and orthogonal to each other. The reflectors are arranged in a grid pattern in the entire optical device. In this configuration, after the light L1 incident on the incidence plane S1 is reflected by the two reflection surfaces S100, for example, the light L1 is blocked by surfaces S101 that face the two reflection surfaces S100. Accordingly, a small amount of light is delivered to the imaging plane 30 to darken an image to be displayed in midair.

In this modification example, in contrast, the plurality of linear structures 11C1 configured by the plurality of reflectors 11C in which the reflection surfaces S26 and S27 are alternately arranged in the X direction while being joined together are disposed in the Y direction. Accordingly, the light L1 incident from the incidence plane S1 and having been reflected by the reflection surfaces S26 and S27 is less prone to be blocked by a side opposite to the reflection surfaces S26 and S27, as illustrated in FIG. 21. This makes it possible to control a decrease in the amount of light to be delivered to the imaging plane 30, thereby maintaining brightness of an image to be displayed in midair.

Moreover, in a case where the cross line CL between the two reflection surfaces S26 and S27 in each of the reflectors 11C is inclined with respect to the incidence plane S1 in a manner similar to that in the foregoing first embodiment, it is possible to decrease the distance between the optical device and the display device 20, thereby achieving effects similar to those in the foregoing first embodiment.

Modification Example 4

[Configuration]

FIG. 22 illustrates a configuration of a key part of an optical device (optical device 10C) according to a first configuration example of modification example 4. FIG. 23 schematically illustrates a cross-sectional configuration of an optical device (optical device 10D) according to a second configuration example of modification example 4. Each of the optical devices 10C and 10D is also, for example, a so-called dihedral corner reflector array as with the optical device 10 according to the foregoing first embodiment. Each of the optical devices 10C and 10D includes a plurality of reflectors 11D two-dimensionally arranged in an array fashion between the incidence plane S1 and the output plane S2.

Each of the plurality of reflectors 11D is a mirror that reflects light incident from the incidence plane S1 once or multiple times (such as twice), thereby guiding the light to the output plane S2, as with the reflectors 11 according to the foregoing first embodiment. Each of the reflectors 11D has two reflection surfaces that are adjacent to each other. In this modification example, the cross line CL (not illustrated in FIGS. 22 and 23) between two reflection surfaces in each of the reflectors 11D may be inclined with respect to the incidence plane S1. Alternatively, the cross line CL may not be inclined with respect to the incidence plane S1 (may be perpendicular to the incidence plane S1). Herein, a case where the cross line CL between the reflection surfaces in each of the reflectors 11D is perpendicular to the incidence plane S1, and an angle that a line of intersection between one of the reflection surfaces and the incidence plane S1 forms with a line of intersection between the other of the reflection surfaces and the incidence plane S1 is, for example, 90° is exemplified as an example. Each of the reflection surfaces according to this modification example also includes a metal thin film formed by a process similar to that used in the foregoing first embodiment.

Note that in the first configuration example (FIG. 22) of this modification example, respective regions between the plurality of reflectors 11D (respective region between the reflection surfaces) are filled with materials having the same index of refraction as one another (resin layers 12 are formed). Each of the resin layers 12 may be made from a resin material having transparency with respect to visible light, for example. Desirably, the same material is used for the respective resin layers 12. However, different materials may be used, as long as the materials have substantially the same index of refraction.

Moreover, in the second configuration example (FIG. 23) of this modification example, the regions between the plurality of reflectors 11D (the respective region between the reflection surfaces) are filled with air (air layers 12a are provided). Thus, the air layers 12a may be provided in the respective regions between the reflection surfaces.

[Workings and Effects]

As with the optical device 10 according to the foregoing first embodiment, each of the optical devices 10C and 10D according to this modification example also causes light based on an image displayed on the display device 20 to be reflected by the reflectors 11D and pass therethrough, which makes it possible to form the image upward each of the optical devices 10C and 10D.

Here, FIG. 24 schematically illustrates a cross-sectional configuration of an optical device (optical device 102) according to comparative example 4. The optical device 102 according to comparative example 4 includes a plurality of reflectors 102B arranged in an array fashion. Each of the reflectors 102B has two reflection surfaces disposed so as to be orthogonal to each other and perpendicular to the incidence plane S1. Moreover, a resin layer 103 or an air layer 104 is formed in each of regions between the reflectors 102B. The resin layers 103 and the air layers 104 are alternately arranged within a plane. Each of the resin layers 103 includes a resin material having transparency with respect to visible light. In the optical device 102 configured above, light beams L21 that pass through and are outputted from the resin layers 103 and light beams L22 that pass through and are outputted from the air layers 104 are present together. Hence, transmittance of the incident light L1 varies depending on the reflectors 102B (depending on which of the resin layer 103 and the air layer 104 the light L1 passes through). As a result, an image to be displayed in midair may cause nonuniform luminance.

In the first configuration example of this modification example, in contrast, the resin layers 12 having the same index of refraction are provided in the respective regions between the reflectors 11D. Alternatively, in the second configuration example of this modification example, the air layers 12a are provided in the respective regions between the reflectors 11D. Any of these configurations allows transmittance of incident light L1 to pass through the reflectors 102B at substantially the same transmittance. Consequently, it is possible to suppress an occurrence of nonuniform luminance of an image to be displayed in midair.

Moreover, in a case where the cross line CL between the two reflection surfaces in each of the reflectors 11D is inclined with respect to the incidence plane S1 in a manner similar to that in the foregoing first embodiment, it is possible to decrease the distance between the optical device 10C or 10D and the display device 20, thereby achieving effects similar to those in the foregoing first embodiment.

Second Embodiment

[Configuration]

FIG. 25 illustrates a configuration of a key part of an optical device according to a second embodiment of the present disclosure. The optical device according to this embodiment is also, for example, a so-called dihedral corner reflector array as with the optical device 10 according to the foregoing first embodiment. This optical device includes a plurality of reflectors 11E two-dimensionally arranged in an array fashion between the incidence plane S1 and the output plane S2.

Each of the plurality of reflectors 11E is a mirror that reflects light incident from the incidence plane S1 once or multiple times (such as twice), thereby guiding the light to the output plane S2, as with the reflectors 11 according to the foregoing first embodiment. Each of the reflectors 11E has two reflection surfaces S28 and S29 that are adjacent to each other. In this modification example, the cross line CL (not illustrated in FIG. 25) between two reflection surfaces S28 and S29 in each of the reflectors 11E may be inclined with respect to the incidence plane S1. Alternatively, the cross lines CL may not be inclined with respect to the incidence plane S1 (may be perpendicular to the incidence plane S1). Herein, a case where the cross line CL between the reflection surfaces S28 and S29 in each of the reflectors 11E is perpendicular to the incidence plane S1, and an angle that a line of intersection between the reflection surface S28 and the incidence plane S1 forms with a line of intersection between the reflection surface S29 and the incidence plane S1 is, for example, 90° is exemplified as an example. Moreover, each of the reflection surfaces S28 and S29 may be perpendicular (90°) to the incidence plane S1. Alternatively, each of the reflection surfaces S28 and S29 may be inclined at an angle in a range from +15° to −15° of this perpendicular direction as a center. It is to be noted that each of the reflection surfaces S28 and S29 includes a metal thin film formed by a process similar to that used in the foregoing first embodiment.

Note that in this embodiment, a functional layer 13 that has a function of absorbing or diffusing light (has a light absorbing property or a light diffusing property) is provided opposite to the reflection surfaces S28 and S29. For example, the functional layer 13 is formed adjacent to a back surface of each of the reflectors 11E (back surfaces of the reflection surfaces S28 and S29) in the optical device. Specifically, the functional layer 13 is formed in a bent shape so as to directly face the respective reflection surfaces S28 and S29. In other words, a pair of reflection surfaces S28 and S29 and the functional layer 13 opposing the reflection surfaces S28 and S29 form a square shape. In short, the plurality of reflectors 11E and the plurality of functional layers 13 are arranged in a grid pattern in an entire device.

In a case where the functional layers 13 have the light absorbing property, for example, each of the functional layers 13 has either a single-layer structure in which one of a black resin layer and a refraction index adjusting layer is provided or a multi-layer structure in which two or more layers of these layers are stacked. Alternatively, in a case where the functional layers 13 have the light diffusing property, each of the functional layers 13 has either a single-layer structure in which a light diffusion resin layer and a layer subjected to shape processing to have a diffusing property or a multi-layer structure in which two or more layers of these layers are stacked. Alternatively, each of the functional layers 13 may be a combination of a layer having the light absorbing property and a layer having the light diffusing property.

[Workings and Effect]

As with the optical device 10 according to the foregoing first embodiment, the optical device according to this embodiment also causes light based on an image displayed on the display device 20 to be reflected by the reflectors 11E and pass therethrough, which makes it possible to form the image upward.

Moreover, the following effect is achievable. Here, FIG. 26 illustrates a planar configuration of an optical device according to comparative example 5 in which no functional layers 13 are formed on the surfaces opposite to the reflectors 11E. In comparative example 5, the light beam L1a incident on each of the reflectors 11E is reflected by the reflection surfaces S28 and 29, and then is outputted as a light beam L2a. In fact, however, light is incident on the reflectors 11E from various angle directions. Therefore, part of the incident light is reflected by surfaces other than the reflection surfaces S28 and S29, which are supposed to be used, to generate a light beam (light beam L50) that is not returned in the same direction as the light beams L1a and L2a. This causes a decrease in luminance, a decrease in contrast caused by an increase in black level (0% level) luminance, generation of noise, etc. in an image to be displayed in midair, thereby resulting in degradation in image quality.

In this embodiment, in contrast, the functional layer 13 having the light absorbing property or the light diffusing property is disposed opposite to the reflection surfaces S28 and S29 in each of the reflectors 11E. Thus, the functional layers 13 absorb or diffuse the light beam L50, which is not returned in a desired direction, in the incident light on the reflectors 11E, thereby blocking the light beam L50, as illustrated in FIG. 25. This makes it possible to suppress a decrease in luminance, a decrease in contrast caused by an increase in black level (0% level) luminance, generation of noise, etc. in an image to be displayed in midair, which makes it possible to reduce degradation in image quality.

Moreover, in a case where the cross line CL between the two reflection surfaces S28 and S29 in each of the reflectors 11E is inclined with respect to the incidence plane S1 in a manner similar to that in the foregoing first embodiment, it is possible to decrease the distance between the optical device and the display device 20, thereby achieving effects similar to those in the foregoing first embodiment.

Modification Example 5

FIG. 27 illustrates a configuration of a key part of an optical device according to a modification example (modification example 5) of the second embodiment. The foregoing second embodiment provides the exemplary configuration in which the plurality of reflectors 11E and the plurality of functional layers 13 are arranged in a grid pattern on the whole. However, the reflectors 11E and the functional layers 13 may be arranged in any of other patterns, as long as the reflectors 11E and the functional layers 13 are disposed opposite to each other.

For example, a plurality of pairs of the reflectors 11E (the reflection surfaces S28 and S29) and the functional layers 13 that form a square shape may be disposed separately within an XY plane, as in this modification example.

FIG. 28 illustrates a planar configuration according to a comparative example (comparative example 6) for this modification example in which no functional layers 13 are formed opposite to the reflectors 11E. Comparative example 6 is similar to comparative example 5 described above in that the light beam L50 that is reflected by surfaces other than reflection surfaces S28 and S29 and is not returned in the same direction as the light beams L1a and L2a is generated. This causes a decrease in luminance, a decrease in contrast caused by an increase in black level luminance, generation of noise, etc. in an image to be displayed in midair, thereby resulting in degradation in image quality. In this modification example, in contrast, it is possible for the functional layers 13 to block the light beam L50, which makes it possible to achieve effects similar to those in the foregoing first embodiment.

Modification Example 6

FIG. 29 illustrates a configuration of a key part of an optical device according to a modification example (modification example 6) of the second embodiment. The foregoing second embodiment provides the exemplary configuration in which the plurality of reflectors 11E and the plurality of functional layers 13 are arranged in a grid pattern on the whole. However, the reflectors 11E and the functional layers 13 may be arranged in any of other patterns, as long as the reflectors 11E and the functional layers 13 are disposed opposite to each other.

For example, a plurality of reflectors 11E each of which has the reflection surfaces S28 and S29 may be arranged in lines while being jointed together in the Y direction, as in this modification example. A plurality of linear structures configured by the plurality of reflectors 11E are arranged in the X direction at predetermined intervals. In this configuration, the functional layers 13 are formed on back surfaces of the respective reflectors 11E.

FIG. 30 illustrates a planar configuration according to a comparative example (comparative example 7) for this modification example in which no functional layers 13 are formed on surfaces opposite to the reflectors 11E. Comparative example 7 is similar to comparative example 5 described above in that the light beam L50 that is reflected by surfaces other than the reflection surfaces S28 and S29 (the back surfaces of the reflection surfaces S28 and S29) and is not returned in the same direction as the light beams L1a and L2a is generated. This causes a decrease in luminance, a decrease in contrast of the image caused by an increase in black level luminance, generation of noise in the image, etc. in an image to be displayed in midair, thereby resulting in degradation in image quality. In this modification example, in contrast, it is possible for the functional layers 13 to block the light beam L50, which makes it possible to achieve effects similar to those in the foregoing first embodiment.

It is to be noted that adjacent ones of the plurality of reflectors exemplified in the first and second embodiments and modification examples 1 to 6 described above, may be disposed while being in contact with one another (joined together) or may be disposed while being separated from each other. Specifically, in reflectors (exemplified as the reflectors 11E) as illustrated in FIG. 31, the reflection surfaces S28 and S29 may be alternately arranged in a sequence, as illustrated in FIG. 32A. Alternatively, gaps may be reserved between adjacent ones of the reflectors 11E, as illustrated in FIG. 32B. In addition, any of the reflection surfaces S28 and S29 may be provided with a notch.

Third Embodiment

[Configuration]

FIG. 33 illustrates a configuration of a key part of a display unit (display unit 2) according to a third embodiment of the present disclosure. The display unit 2 is similar to the display unit 1 according to the foregoing first embodiment in that the display device 20 is provided on the incidence plane S1 side of an optical device (optical device 10E). In the optical device 10E, the plurality of reflectors 11E according to the foregoing second embodiment are two-dimensionally disposed in an array fashion between the incidence plane S1 and the output plane S2. Any of various displays may be used as the display device 20. Examples of the displays include an organic EL display, a liquid crystal display, an electrophoretic display, and an LED display. The display device 20 is disposed such that light outputted from the display device 20 is incident on each of the reflectors 11E in the optical device 10E from obliquely below. It is to be noted that herein, a configuration that uses the optical device 10E provided with the reflectors 11E according to the foregoing second embodiment is described as an example. However, the configuration of this embodiment is also applicable to any of the optical devices according to the embodiments and the modification examples described above.

This embodiment, however, differs from the foregoing first embodiment in that an optical direction control film 14 is disposed between the optical device 10E and the display device 20, that is, opposite to the incidence plane S1 of the optical device 10E. Here, for example, in a case where a liquid crystal display is used as the display device 20, the display device 20 includes a sheet polarizer 211A, a liquid crystal panel 212, and a sheet polarizer 211B on a light emission side of a backlight 210. The optical direction control film 14 is disposed between the optical device 10E and the sheet polarizer 211B positioned on an upper side (light emission side) of them.

The optical direction control film 14 has a function of controlling an output direction (output angle) of light incident thereon. Specifically, for example, the optical direction control film 14 is configured such that an output direction of light within a plane along a rightward-leftward direction of a screen of the display device 20 falls within a range from −45° to +45° both inclusive, where a direction perpendicular to a display screen is defined as 0°, as illustrated in FIG. 34A. As a result, a luminance distribution A11 of light outputted from the optical direction control film 14 is controlled to fall within a range from −45° to +45° both inclusive with a peak in a 0° direction, as illustrated in FIG. 34B. It is to be noted that a luminance distribution A12 indicates a luminance distribution of light outputted from the display device 20 that is not provided with the optical direction control film 14.

Moreover, the optical direction control film 14 is configured such that an output direction of light within a plane along an upward-downward direction of the screen falls within a range from −45° to +45° both inclusive, as illustrated in FIG. 35A. As a result, a luminance distribution A21 of light outputted from the optical direction control film 14 falls within a range from −45° to +45° both inclusive with a peak in a 0° direction, as illustrated in FIG. 35B. It is to be noted that a luminance distribution A22 indicates a luminance distribution of light outputted from the display device 20 that is not provided with the optical direction control film 14.

Examples of the optical direction control film 14 include VC-FILM or Advanced-VC-FILM (produced by Shin-Etsu Polymer Co., Ltd.), LUMISTY (produced by Sumitomo Chemical Company, Limited), a louver film "LAF" (produced by Dai Nippon Printing Co., Ltd.), a privacy screen protector produced by 3M Company; a liquid crystal polymer film or a micropillar (light control) film produced by TOMOEGAWA CO., LTD.; and a direction turning film produced by Luminit LLC. The optical direction control film 14 may use one of the above-described films, or may use a laminate including two or more layers of one or more kinds of the above-described films.

[Workings and Effects]

As with the display unit 1 according to the foregoing first embodiment, in the display unit 2 according to this embodiment, in a case where an image is displayed on the display device 20, light of this image is incident on the reflectors 11E in the optical device 10E from the incidence plane S1, and thereafter is reflected by the reflectors 11E to be outputted from the output plane S2. This makes it possible to form an image of image light upward the optical device 10E.

However, light is incident on the reflectors 11E in the optical device 10E from various angle directions. In fact, light, as described above, that is reflected twice and returned in a desired direction (a direction toward the imaging plane 30) and light that is not returned are present together. Specifically, whereas a light beam incident at an incident angle of 45° or less with respect to an axis X1 (herein, an X-axial direction) that forms an angle of 45° with both the reflection surfaces S28 and S29 is returned, a light beam incident at an incident angle of more than 45° is not returned. For example, light beams L1b that are incident at an angle θ3 of 45° or less with respect to the axis X1 and light beams L1c that are incident at an angle θ3 of more than 45° with respect to the axis X1 are present together at a point P31, as illustrated in FIG. 36A. In these light beams, the light beams L1b are returned, but the light beams L1c are not returned. This is also applicable to light beams incident on points (points P32 and P33) other than the point P31, as illustrated in FIGS. 36B and 36C. Whereas light beams incident at an angle θ3 is 45° or less are returned, light beams incident at an angle θ3 of more than 45° are not returned. It is to be noted that FIGS. 36A to 36C each illustrate, as ranges incident on the reflection surfaces S28 and S29, a range (return range) of θ3≤45° defined as Ra and a range (no-return range) of θ3>45° defined as Rb.

In the configuration described above, light incident on the optical device 10E contains light that is not returned in a desired direction. This causes a decrease in luminance, a decrease in contrast of the image caused by an increase in black level luminance, generation of noise in the image, etc. in an image to be displayed in midair, thereby resulting in degradation in image quality.

In this embodiment, in contrast, the optical direction control film 14 is provided between the display device 20 and the optical device 10E to control the angle direction of light incident on the optical device 10. This makes it possible to control incident light beams incident on each of the reflectors 11E (the reflection surfaces S28 and S29) to form an angle of 45° or less with the axis X1, as illustrated in FIG. 37. In other words, this makes it possible to control light beams incident on each of the reflectors 11E (the reflection surfaces S28 and S29) to travel along optical paths within the range Ra. In this way, in this embodiment, the optical direction control film 14 is used, which makes it possible to control an incident angle of light incident on the optical device 10E.

As described above, in this embodiment, it is possible to easily return light incident on the optical device 10E in a desired direction through reflection by the reflectors 11E (it is possible to attenuate light that is not to be returned). This makes it possible to suppress a decrease in luminance, a decrease in contrast of the image caused by an increase in black level luminance, generation of noise in the image, etc. in an image to be displayed in midair, which makes it possible to reduce degradation in image quality. Thus, effects similar to those in the foregoing first embodiment are achievable.

The present disclosure has been described with reference to some embodiments. However, the present disclosure is not limited to the examples described in these embodiments and may be modified in various ways. For example, it is not necessary to include all constituent elements described in the foregoing embodiments, and some additional constituent elements may be further included. Moreover, the materials, thicknesses, manufacturing processes, etc. for the above constituent elements are illustrative and non-limiting.

It is to be noted that the effects described in the foregoing embodiments are illustrative, and effects of the present disclosure may be other effects or may further include other effects.

It is to be noted that the contents of the present disclosure may have the following configurations.

(1) An optical device including:

an incidence plane and an output plane facing each other; and a plurality of reflectors that are disposed between the incidence plane and the output plane and each reflect light incident from the incidence plane toward the output plane, each of the plurality of reflectors having a first reflection surface and a second reflection surface disposed orthogonal to each other, and a line of intersection between the first reflection surface and the second reflection surface being inclined with respect to a normal to the incidence plane.

(2) The optical device according to (1), in which both of the first reflection surface and the second reflection surface are disposed to be inclined with respect to the incidence plane.

(3) The optical device according to (1), in which one of the first reflection surface and the second reflection surface is disposed to be inclined with respect to the incidence plane, and the other is disposed perpendicular to the incidence plane.

(4) The optical device according to any one of (1) to (3), in which
intervals between adjacent ones of the reflectors are set to be larger at a second end than at a first end of a plane, the second end being away from the first end.
(5) The optical device according to (4), in which
the intervals sequentially vary from the first end toward the second end.
(6) The optical device according to any one of (1) to (5), in which
the plurality of reflectors are arranged in a matrix fashion in plan view.
(7) The optical device according to (6), in which
the first reflection surfaces and the second reflection surfaces in the plurality of reflectors are alternatively arranged in a first direction while being joined together, to constitute linear structures, and a plurality of the structures are arranged in a second direction orthogonal to the first direction.
(8) The optical device according to any one of (1) to (7), in which
regions between the plurality of reflectors are filled with materials having the same index of refraction as one another or air.
(9) The optical device according to any one of (1) to (8), in which
a functional layer having a function of absorbing or diffusing incident light is provided opposite to the first reflection surface and the second reflection surface of the reflector.
(10) The optical device according to any one of (1) to (9), in which
an optical direction control film is provided opposite to the incidence plane.
(11) A display unit including:
an optical device; and
a display device that displays an image toward the optical device,
the optical device including
an incidence plane and an output plane facing each other, and
a plurality of reflectors that are disposed between the incidence plane and the output plane and each reflect light incident from the incidence plane toward the output plane,
each of the plurality of reflectors having a first reflection surface and a second reflection surface disposed orthogonal to each other, and
a line of intersection between the first reflection surface and the second reflection surface being inclined with respect to a normal to the incidence plane.
(12) The display unit according to (11), in which
both of the first reflection surface and the second reflection surface are disposed to be inclined with respect to the incidence plane.
(13) The display unit according to (11), in which
one of the first reflection surface and the second reflection surface is disposed to be inclined with respect to the incidence plane, and the other is disposed perpendicular to the incidence plane.
(14) The display unit according to any one of (11) to (13), in which
intervals between adjacent reflectors are set to be larger at a second end than at a first end of a plane, the second end being away from the first end.
(15) The display unit according to (14), in which
the intervals sequentially vary from the first end toward the second end.
(16) The display unit according to (14) or (15), in which
the display device is disposed opposite to the first end of the incidence plane of the optical device.
(17) The display unit according to any one of (11) to (16), in which
the plurality of reflectors are arranged in a matrix fashion in plan view.
(18) The display unit according to (17), in which
the first reflection surfaces and the second reflection surfaces in the plurality of reflectors are alternatively arranged in a first direction while being joined together, to constitute linear structures, and a plurality of the structures are arranged in a second direction orthogonal to the first direction.
(19) The display unit according to any one of (11) to (18), in which
regions between the plurality of reflectors are filled with materials having the same index of refraction as one another or air.
(20) The display unit according to any one of (11) to (19), in which
a functional layer having a function of absorbing or diffusing light is provided opposite to the first reflection surface and the second reflection surface of the reflector.
(21) The display unit according to any one of (11) to (20), in which
an optical direction control film is provided between the optical device and the display device.

This application is based upon and claims the benefit of priority of the Japanese Patent Application No. 2015-147379 filed with the Japan Patent Office on Jul. 27, 2015, the entire contents of which are incorporated herein by reference.

It should be understood that those skilled in the art can contemplate various modifications, combinations, sub-combinations, and variations on the basis of design requirements and other factors insofar as they are within the scope of the appended claims or the equivalents thereof.

The invention claimed is:
1. An optical device, comprising:
an incidence plane;
an output plane, wherein the incidence plane faces the output plane; and
a plurality of reflectors between the incidence plane and the output plane, wherein
each reflector of the plurality of reflectors is configured to reflect light incident from the incidence plane toward the output plane,
each reflector of the plurality of reflectors comprises a first reflection surface and a second reflection surface,
a line of intersection between the first reflection surface and the second reflection surface is inclined with respect to a normal to the incidence plane,
a first interval between a first pair of adjacent reflectors of the plurality of reflectors is smaller than a second interval between a second pair of adjacent reflectors of the plurality of reflectors,
the first pair of adjacent reflectors is at a first end of the incidence plane,
the second pair of adjacent reflectors is at a second end of the incidence plane, and
a distance between the first end of the incidence plane and a device from which the light is incident on the incidence plane is smaller than a distance between the second end of the incidence plane and the device.

2. The optical device according to claim 1, wherein each of the first reflection surface and the second reflection surface is inclined with respect to the incidence plane.

3. The optical device according to claim 1, wherein
one of the first reflection surface or the second reflection surface is inclined with respect to the incidence plane, and
other of the first reflection surface or the second reflection surface is perpendicular to the incidence plane.

4. The optical device according to claim 1, wherein
a plurality of intervals between the plurality of reflectors includes the first interval and the second interval, and
the plurality of intervals sequentially varies from the first end toward the second end.

5. The optical device according to claim 1, wherein the plurality of reflectors is in a matrix.

6. The optical device according to claim 1, wherein an index of refraction of each of a plurality of materials between the plurality of reflectors is the same.

7. The optical device according to claim 1, further comprising a functional layer, wherein the functional layer is configured to absorb a light beam of the light incident on the incidence plane.

8. The optical device according to claim 1, wherein an optical direction control film is opposite to the incidence plane.

9. The optical device according to claim 1, wherein a normal to the first reflection surface is orthogonal to a normal to the second reflection surface.

10. The optical device according to claim 1, further comprising a functional layer configured to diffuse a light beam of the light incident on the incidence plane, wherein the functional layer is opposite to the first reflection surface and the second reflection surface.

11. A display unit, comprising:
an optical device; and
a display device configured to display an image toward the optical device, wherein the optical device includes:
an incidence plane;
an output plane, wherein the incidence plane faces the output plane; and
a plurality of reflectors between the incidence plane and the output plane,
wherein
each reflector of the plurality of reflectors is configured to reflect light incident from the incidence plane toward the output plane,
each reflector of the plurality of reflectors comprises a first reflection surface and a second reflection surface,
a line of intersection between the first reflection surface and the second reflection surface is inclined with respect to a normal to the incidence plane,
a first interval between a first pair of adjacent reflectors of the plurality of reflectors is smaller than a second interval between a second pair of adjacent reflectors of the plurality of reflectors,
the first pair of adjacent reflectors is at a first end of the incidence plane,
the second pair of adjacent reflectors is at a second end of the incidence plane, and
a distance between the first end of the incidence plane and the display device from which the light incident on the incidence plane is smaller than a distance between the second end of the incidence plane and the display device.

12. The display unit according to claim 11, wherein each of the first reflection surface and the second reflection surface is inclined with respect to the incidence plane.

13. The display unit according to claim 11, wherein
one of the first reflection surface or the second reflection surface is inclined with respect to the incidence plane, and
other of the first reflection surface or the second reflection surface is perpendicular to the incidence plane.

14. The display unit according to claim 11, wherein
a plurality of intervals between the plurality of reflectors includes the first interval and the second interval, and
the plurality of intervals sequentially varies from the first end toward the second end.

15. The display unit according to claim 11, wherein the display device is opposite to the first end of the incidence plane.

16. The display unit according to claim 11, wherein the plurality of reflectors is in a matrix.

17. The display unit according to claim 11, wherein
an index of refraction of each of a plurality of materials between the plurality of reflectors is the same.

18. The display unit according to claim 11, further comprising a functional layer, wherein the functional layer is further configured to absorb a light beam of the light incident on the incidence plane.

19. The display unit according to claim 11, further comprising an optical direction control film between the optical device and the display device.

* * * * *